(12) United States Patent
Daniels et al.

(10) Patent No.: US 10,311,643 B2
(45) Date of Patent: Jun. 4, 2019

(54) ACCURATE POSITIONING OF AUGMENTED REALITY CONTENT

(71) Applicant: YouAR INC., Portland, OR (US)

(72) Inventors: Oliver Clayton Daniels, Portland, OR (US); David Morris Daniels, Portland, OR (US); Raymond Victor Di Carlo, Portland, OR (US); Carlo J. Calica, Brush Prairie, WA (US); Luke Timothy Hartwig, Portland, OR (US)

(73) Assignee: YouAR INC., Portland, OR (US)

( * ) Notice: Subject to any disclaimer, the term of this patent is extended or adjusted under 35 U.S.C. 154(b) by 86 days.

(21) Appl. No.: 15/592,047

(22) Filed: May 10, 2017

(65) Prior Publication Data

US 2018/0005450 A1 Jan. 4, 2018

Related U.S. Application Data

(63) Continuation-in-part of application No. PCT/US2015/060231, filed on Nov. 11, 2015.

(60) Provisional application No. 62/078,287, filed on Nov. 11, 2014.

(51) Int. Cl.
*G06T 19/00* (2011.01)
*G01S 19/01* (2010.01)
*G06K 9/00* (2006.01)

(52) U.S. Cl.
CPC ........... *G06T 19/006* (2013.01); *G01S 19/01* (2013.01); *G06K 9/00671* (2013.01); *G06T 2215/16* (2013.01)

(58) Field of Classification Search
None
See application file for complete search history.

(56) References Cited

U.S. PATENT DOCUMENTS

| 6,023,654 | A | 2/2000 | Möhlenkamp |
| 7,714,895 | B2 | 5/2010 | Pretlove et al. |
| 8,818,609 | B1 | 8/2014 | Bokyo et al. |
| 9,307,360 | B1 | 4/2016 | Zhyshko |
| 2004/0189675 | A1 | 9/2004 | Pretlove et al. |
| 2006/0200469 | A1 | 9/2006 | Chidambaran et al. |
| 2007/0067349 | A1 | 3/2007 | Jhaveri et al. |
| 2007/0081695 | A1 | 4/2007 | Foxlin et al. |
| 2011/0316845 | A1 | 12/2011 | Roberts et al. |

(Continued)

FOREIGN PATENT DOCUMENTS

| WO | 2016077493 A1 | 5/2016 |
| WO | 2016077506 A1 | 5/2016 |

OTHER PUBLICATIONS

U.S. Receiving Office, International Search Report in PCT Patent Application No. PCT/US2015/060215, dated Feb. 4, 2016, 2 pages.
U.S. Receiving Office, Written Opinion of the International Searching Authority in PCT Patent Application No. PCT/US2015/060215, dated Feb. 4, 2016, 5 pages.

(Continued)

*Primary Examiner* — Michelle Chin
(74) *Attorney, Agent, or Firm* — Kolitch Romano LLP

(57) ABSTRACT

A system for accurately positioning augmented reality (AR) content within a coordinate system such as the World Geodetic System (WGS) may include AR content tethered to trackable physical features. As the system is used by mobile computing devices, each mobile device may calculate and compare relative positioning data between the trackable features. The system may connect and group the trackable features hierarchically, as measurements are obtained. As additional measurements are made of the trackable features in a group, the relative position data may be improved, e.g., using statistical methods.

38 Claims, 25 Drawing Sheets

(56) References Cited

U.S. PATENT DOCUMENTS

| | | |
|---|---|---|
| 2012/0075343 A1 | 3/2012 | Chen et al. |
| 2012/0096114 A1 | 4/2012 | Mccolgan et al. |
| 2012/0107790 A1 | 5/2012 | Lee et al. |
| 2012/0113145 A1 | 5/2012 | Adhikari et al. |
| 2012/0249586 A1 | 10/2012 | Wither et al. |
| 2012/0307075 A1 | 12/2012 | Margalit |
| 2012/0320039 A1 | 12/2012 | Ha et al. |
| 2013/0076788 A1 | 3/2013 | Ben Zvi |
| 2013/0135344 A1 | 5/2013 | Stirbu et al. |
| 2013/0162673 A1 | 6/2013 | Bohn |
| 2013/0278631 A1 | 10/2013 | Border et al. |
| 2013/0293468 A1 | 11/2013 | Perez et al. |
| 2013/0297764 A1 | 11/2013 | Patel et al. |
| 2013/0311868 A1 | 11/2013 | Monney et al. |
| 2013/0328762 A1 | 12/2013 | McCulloch et al. |
| 2014/0098180 A1 | 4/2014 | Periyannan et al. |
| 2014/0204084 A1 | 7/2014 | Corazza et al. |
| 2014/0244788 A1 | 8/2014 | Resch et al. |
| 2014/0248950 A1 | 9/2014 | Tosas Bautista |
| 2014/0267261 A1 | 9/2014 | Samavati et al. |
| 2014/0270477 A1 | 9/2014 | Coon |
| 2015/0002542 A1 | 1/2015 | Chan et al. |
| 2015/0040074 A1 | 2/2015 | Hofmann et al. |
| 2015/0046295 A1 | 2/2015 | Hart |
| 2015/0347850 A1 | 12/2015 | Berelejis et al. |
| 2016/0133230 A1 | 5/2016 | Daniels et al. |

OTHER PUBLICATIONS

U.S. Receiving Office, International Search Report in PCT Patent Application No. PCT/US2015/060231, dated Mar. 16, 2016, 4 pages.

U.S. Receiving Office, Written Opinion of the International Searching Authority in PCT Patent Application No. PCT/US2015/060231, dated Mar. 16, 2016, 7 pages.

U.S. Patent and Trademark Office, Office action in U.S. Appl. No. 14/538,641, dated Aug. 12, 2016, 54 pages.

U.S. Receiving Office, International Search Report in PCT Patent Application No. PCT/US2016/057417, dated Jan. 10, 2017, 2 pages.

U.S. Receiving Office, Written Opinion of the International Searching Authority in PCT Patent Application No. PCT/US2016/057417, dated Jan. 10, 2017, 5 pages.

The International Bureau of WIPO, International Preliminary Report on Patentability in PCT Patent Application No. PCT/US2015/060215, dated May 26, 2017, 6 pages.

The International Bureau of WIPO, International Preliminary Report on Patentability in PCT Patent Application No. PCT/US2015/060231, dated May 26, 2017, 8 pages.

U.S. Receiving Office, International Search Report in PCT Patent Application No. PCT/US2017/023902, dated Jun. 16, 2017, 2 pages.

U.S. Receiving Office, Written Opinion of the International Searching Authority in PCT Patent Application No. PCT/US2017/023902, dated Jun. 16, 2017, 4 pages.

Cheok et al., "Magic Land—A Mixed Reality Interactive System Integrating 3D Live Persons", Singapore Mixed Reality Lab, 2004.

$$\frac{1}{e^{2/13}\sqrt{26\pi}}$$

V1 = (X1, Y1, Z1, W1, P1, R1, U1): MEASURED RELATIVE TO POS_1
V2 = (X2, Y2, Z2, W2, P2, R2, U2): MEASURED RELATIVE TO POS_1
V4: COFIG = (X1-X2, Y1-Y2, Z1-Z2, W1-W2, P1-P2, R1-R2, U1-U2): CALCULATED
    = (X4, Y4, Z4, W4, P4, R4, U4): CALCULATED
V5 = (X5, Y5, Z5, W5, P5, R5, 0): DEFINED

V6 = (X6, Y6, Z6, W6, P6, R6, U6): MEASURED
V4: COFIG = (X4, Y4, Z4, W4, P4, R4, U4): PREVIOUSLY CALCULATED
V5 = (X5, Y5, Z5, W5, P5, R5, 0): DEFINED
AR RENDERED RELATIVE TO POS_2 = V6 + V5 + V4: CALCULATED
    = (X6+X5+X4, Y6+Y5+Y4, Z6+Z5+Z4, W6+W5+W4, P6+P5+P4, R6+R5+R4, U6+U5+U4)

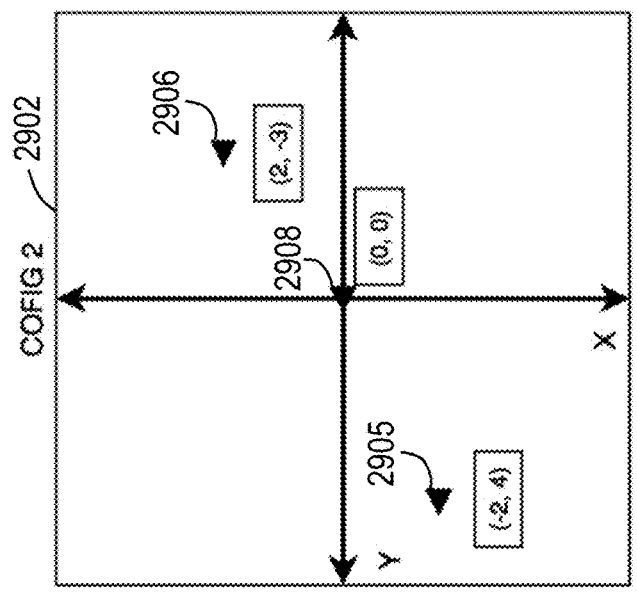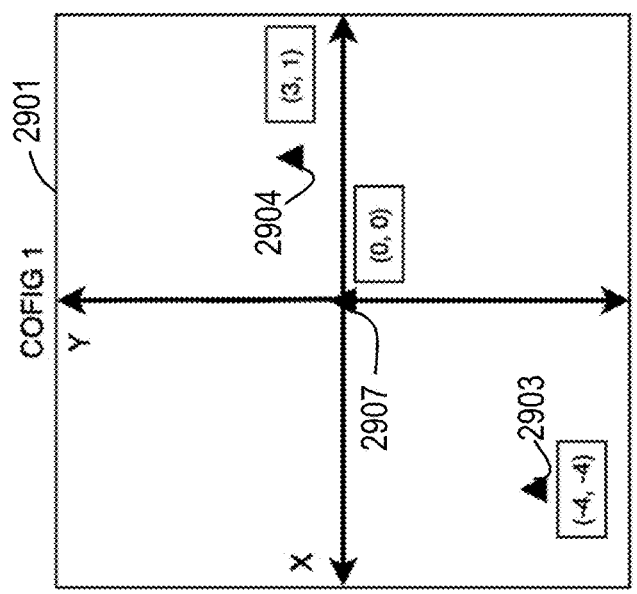
FIG. 29

ACCURATE POSITIONING OF AUGMENTED REALITY CONTENT

CROSS-REFERENCES

This application is a continuation in part of PCT Patent Application Serial No. PCT/US2015/060231, filed Nov. 11, 2015, which in turn is based upon and claims the benefit under 35 U.S.C. § 119(e) of U.S. Provisional Patent Application Ser. No. 62/078,287, filed Nov. 11, 2014. Each of these priority applications is hereby incorporated by reference in its entirety, for all purposes.

This application also relates to U.S. patent application Ser. No. 14/538,641, entitled "Real-Time Shared Augmented Reality Experience," filed Nov. 11, 2014, the entire contents of which are hereby incorporated herein by reference in their entirety, for all purposes.

FIELD

The present application relates to computer-generated augmented reality.

INTRODUCTION

Augmented reality (AR) (also known as mixed reality, or MR) is a live view of a real-world environment that includes supplemental computer generated elements such as sound, video, graphics, text, or positioning data (e.g., global positioning system (GPS) data). For example, a user can use a mobile device or digital camera to view a live image of a real-world location, and the mobile device or digital camera can then be used to create an augmented reality experience by displaying computer-generated elements over the live image of the real world. The device presents the augmented reality to a viewer as if the computer-generated content was a part of the real world.

A fiducial marker (e.g., an image with clearly defined edges, a quick response (QR) code, etc.), can be placed in a field of view of the capturing device. This fiducial marker serves as a reference point. Using the fiducial marker, for example, the scale for rendering computer-generated content can be determined by comparison calculations between the real-world scale of the fiducial marker and its apparent size in the visual feed.

An augmented reality application can overlay any computer-generated information on top of the live view of the real-world environment. This augmented reality scene can be displayed on many types of devices, including computers, phones, tablets, pads, headsets, head-up displays (HUDs), glasses, visors, and/or helmets. For example, the augmented reality of a proximity-based application can include floating store or restaurant reviews on top of a live street view captured by a mobile device running the augmented reality application.

However, traditional augmented reality technologies generally present a first person view of the AR experience to a person who is near the actual real-world location. Traditional augmented reality always takes place "onsite" in a specific location, or when viewing specific objects or images, with computer-generated artwork, animation, or live video placed over the corresponding real-world live image using a variety of methods. This means only those who are actually viewing the AR content in a real environment can fully understand and enjoy the experience. The requirement of proximity to a real-world location or object significantly limits the number of people who can appreciate and experience an onsite augmented reality event at any given time.

SUMMARY

The present disclosure provides systems, apparatuses, and methods relating to improved accuracy in positioning for augmented reality (AR) content. In some embodiments, a computer-implemented method for accurately locating augmented reality (AR) content may include: measuring, using one or more sensors of a computing device, a first six-degree-of-freedom (DOF) vector between a first vantage point of the computing device and a first trackable feature in a first sensor range of the computing device; measuring, using the one or more sensors of the computing device, a second six-DOF vector between a second vantage point of the computing device and a second trackable feature in a second sensor range of the computing device; measuring, using the one or more sensors of the computing device, a third six-DOF vector between the first vantage point and the second vantage point; estimating, based on the first vector, the second vector, and the third vector, using a processor of the computing device, a fourth six-DOF vector between the first trackable feature and the second trackable feature; storing the estimated fourth vector in a data store in association with the first trackable feature and the second trackable feature, such that the estimated fourth vector represents a spatial relationship between the first trackable feature and the second trackable feature; determining, within a common spatial coordinate system, a first set of spatial coordinates for the first trackable feature and a second set of spatial coordinates for the second trackable feature; and storing, in the data store, the first set of spatial coordinates associated with the first trackable feature and the second set of spatial coordinates associated with the second trackable feature, such that the first and second sets of spatial coordinates represent respective locations of the first and second trackable features within the common coordinate system; wherein the data store includes a fifth six-DOF vector representing a spatial relationship and an orientation of an AR content item relative to the first trackable feature.

In some embodiments, a computer-implemented method may include: maintaining, in a data store, a set of trackable points, each trackable point representing a trackable physical feature to which an augmented reality (AR) content item is tetherable; for each trackable point in the set of trackable points, maintaining a first set of estimated spatial values and a second set of estimated spatial values in the data store, the first set of estimated spatial values representing a position of the respective trackable point in a respective group coordinate system, and, by extension, one or more spatial relationships between the respective trackable point and all other trackable points of a respective group of trackable points positioned within the respective group coordinate system, and the second set of estimated spatial values representing a position of the respective trackable point in a respective global coordinate system; obtaining first measurement data using at least one first mobile computing device, the first measurement data comprising a plurality of first measurements relating to a plurality of onsite trackable physical features within a selected real-world environment, the at least one first mobile computing device being onsite with respect to the selected real-world environment; for each first set of spatial values corresponding to the plurality of local trackable physical features, maintaining a respective uncertainty value corresponding to the first measurement data; obtaining second measurement data using at least one onsite second computing device, the second measurement data comprising at least one second measurement relating to the plurality of onsite trackable physical features within the selected real-world environment; and updating the first and second estimated spatial values of at least one trackable point in the set of trackable points, based on the second measurement data.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 29 depicts a first stage of an illustrative method for combining two COFIGs into a parent COFIG and relating Trackables thereof, according to the present teachings.

DETAILED DESCRIPTION

Figure 1:
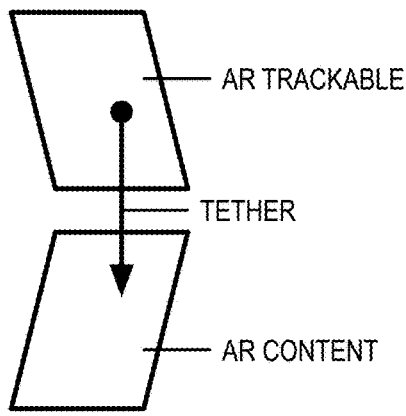
FIG. 1 is a diagram that shows point creation: how AR content may be connected to a Trackable with a tether, maintaining a relationship between the Trackable's understood location and the AR content's understood location, in accordance with aspects of the present disclosure.

Various aspects and examples of an accurate positioning system for augmented reality content, as well as related methods, are described below and illustrated in the associated drawings. Unless otherwise specified, a positioning system according to the present teachings, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AR technology" refers to a large group of technologies, including all forms of computer vision, structured light (e.g., infrared, laser), IMU (e.g., gyroscopes, compasses, accelerometers), non-visible waves (e.g., sonar), motion libraries (e.g., pedestrian dead reckoning (PDR)) and/or technologies by which geometry can be ascertained to relate or ground a point or place—and that is used to align AR content (e.g., artwork) or AR events to geometric spatial reality or local physical environment in proximity to any viewer or user of an AR-capable visual device.

"Trackable" refers to a feature (e.g., a physical feature or object in a real-world environment) or set of features (that can be tracked with AR technology) that has been recognized and has had the data which would enable a mobile device to identify the feature and calculate its position relative to the mobile device recorded or stored, in some cases along with an estimated global coordinate position, (such as WGS coordinates). The Trackable may provide relative position and pose information to a mobile computing device.

"AR content" includes any visual, auditory, haptic, or other sensory event created by a user or developer, either on location or offsite, to be experienced either in AR or VR, through any number of computing devices. These events may include images, animations, live action footage, programs, code, sounds, or haptic feedback (e.g., vibrations or forces applied to simulate a sense of touch), and the hierarchies of objects (including but not limited to shaders, particles, lights, voxels, avatars, scripts, programs, procedural objects, images, or visual effects) that can make up these events.

"Tethering" refers to the act or concept of associating a particular piece of AR content to one or more Trackables, and defining a positional relationship between the content and Trackable(s), to facilitate display of the AR content at a specific point in real-world space.

"GPS" refers to the global positioning system, and is used herein as shorthand for a useful local or global transmitter network giving coordinate height, longitude, and latitude within a common framework. The well-known global positioning system (GPS) uses a standard geographic coordinate system known as the World Geodetic System (WGS). Accordingly, as used herein, "GPS coordinates" are substantially identical to WGS coordinates, and both terms may be used to indicate the actual geographic position of an object or reference point. Additionally, systems described herein may be used with any suitable coordinate system, not necessarily limited to GPS/WGS.

Context and Illustrative Technical Problems Being Addressed

Traditionally, AR content is positioned one of two ways: locally and globally. Locally, AR may be positioned in relation to a trackable feature near the camera, for example a Marker/QR code, or in 3-D space (e.g., with a point cloud). Globally positioned AR, on the other hand, is positioned relative to a global coordinate system (typically the World Geodetic System (WGS) or the like). As such, this positioning is limited by how accurately and precisely the device can locate and orient itself within the same coordinate system.

A major problem arises when two devices are attempting to see persistent AR content (i.e., the same AR content item, not two separate instances of that item), globally positioned in the same exact location, at different points in time. Known systems have attempted to address this problem, for example, by storing a geo-positioned point cloud (with which the initial device associates the AR content item) on a network server, where it is later sent to a second device approaching the geo-position. With luck, the second device may recognize the point cloud and display the AR content item appropriately. However even in this scenario, due to the nature of point clouds, if the second device is viewing the point cloud in a position that is too different (i.e., outside of the allowable variance) from the position of the initial device when it generated the point cloud, then the AR content cannot be positioned and displayed properly.

For AR content items meant to persist in a geo-positioned location (i.e., locked to a physical point in space, not to a movable object) this is an unacceptable problem. The systems and methods described herein address this problem, for example by determining and storing the physical relationships between trackable features (e.g., distance, orientation, etc.). Accordingly, a second device tracking a second trackable (e.g., a second point cloud) can leverage its geo-position information to position and display the AR content that was initially positioned relative to the first trackable feature (e.g., the first point cloud). The present disclosure also provides systems and methods for improving the accuracy and/or reducing uncertainty of positioning information.

Systems and methods outlined herein also solve a similar problem, which is dynamically generating GPS coordinates for point clouds on moving objects, and more generally, any trackable point in space on a moving object. These can be used for downloading point cloud information on an as-needed basis, such that the device does not need to contain or recognize all point clouds in the system.

The present disclosure describes a multilevel system, referred to herein as LockAR, for accurately positioning augmented reality (AR) content within a reference coordinate system, e.g., WGS84. (Although WGS and the related GPS system are referenced herein, any suitable geographical coordinate system may be used). The LockAR system requires no initial quality position data. Instead, AR content is tethered to Trackables, which are real-world features that can be tracked with AR technology and that have identifying data stored along with an estimated geographical position (e.g., using WGS coordinates).

As the LockAR system is utilized by mobile computing devices over time, each mobile device calculates and compares relative positioning data between Trackables that are visible, perceivable to sensor(s), or otherwise accessible to the device. As measurements are made between the Trackables, the system connects and groups the Trackables hierarchically. As additional measurements are made of Trackables in a group, the relative position data is also improved, e.g., using statistical methods.

The present disclosure further describes a method for accurately associating AR content with physical location(s) (e.g., Trackables). Based on technologies such as fiducial markers and SLAM (Simultaneous Location and Mapping), the method uses trackable features of the environment and GPS coordinates to accurately position the AR content. Using information regarding the relative positions of the trackable features, gathered from user devices, the method further improves the accuracy of the position of the AR content over time.

Overview of LockAR

FIG. 1 is a diagram that shows point creation; how AR content is connected to a Trackable with a Tether, maintaining a relationship between the Trackable's understood location and the AR content's understood location. In FIG. 1, a trackable feature has GPS coordinate data assigned to the trackable feature when the trackable feature is turned into a "Trackable" by a user. In an example, a trackable feature may be turned into a Trackable by a user tethering AR content to the trackable feature. In FIG. 1, a tether (e.g., a spatial vector) links the AR content to a Trackable. Non-limiting examples of AR content include images, visuals, events, animation, audio, etc., which may be stored in digital form within a computing system and presented by the computing system.

Figure 2:
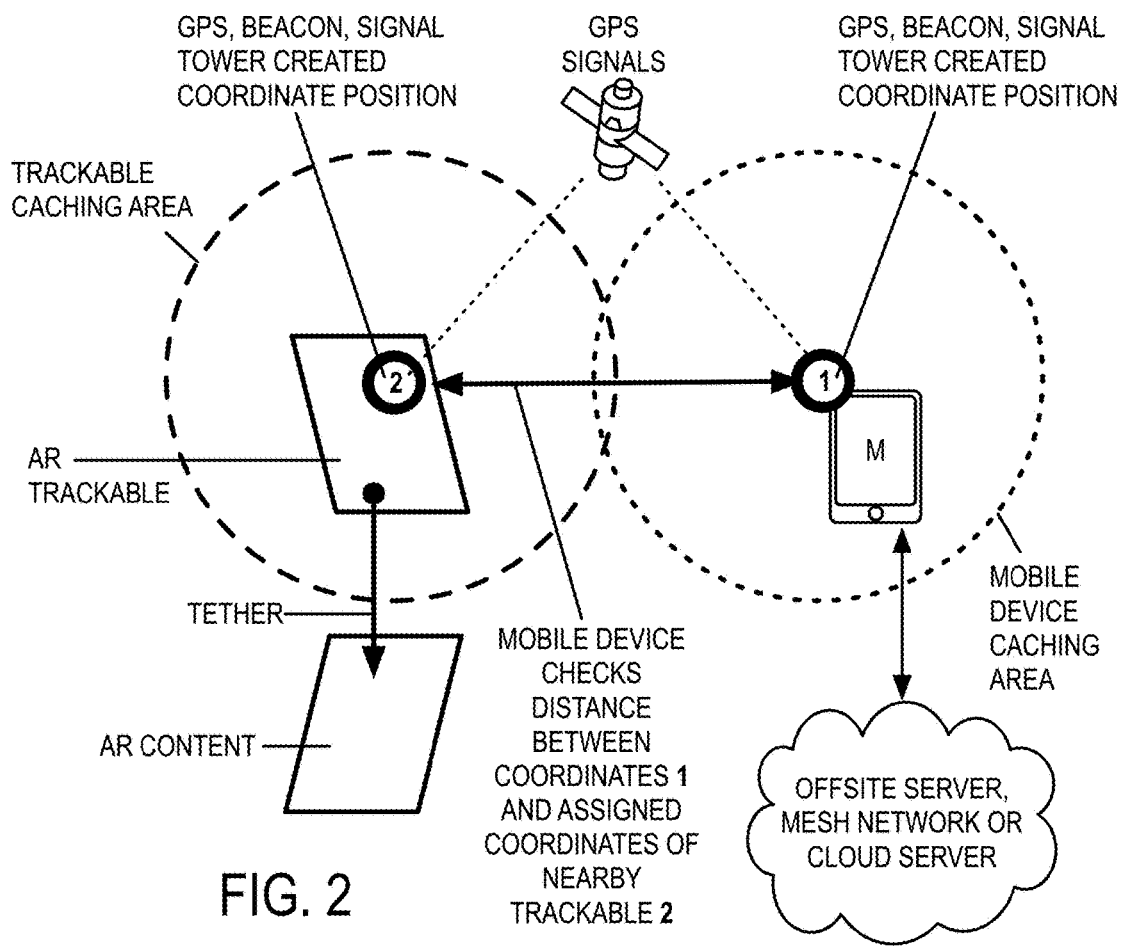
FIG. 2 is an overview diagram showing how a Mobile Digital Device (MDD) may locate and position AR content according to the present teachings.

FIG. 2 is an overview diagram defining key terms. It shows how a Mobile Digital Device (MDD) locates and positions AR content. Specifically using a "Trackable Caching Area" and a "MDD Caching Area" to decide when to download content. Position of MDD can be done via GPS or similar beacon system. In FIG. 2, a mobile digital device (MDD) (i.e., a mobile device) checks the distance between its GPS coordinates (1) and the assigned coordinates of a nearby Trackable (2). GPS (or any other signal or triangulation system) can be the coordinate basis for identifying where a mobile device is in relation to a trackable. The mobile device calculates the distance to the Trackable, and when the mobile device caching area and the Trackable caching area overlap with each other, the mobile device retrieves (e.g., downloads from a server system) the data describing or otherwise defining aspects of the Trackable and the AR content (and AR data associated with the AR content) that is tethered to the Trackable. In an example, the Trackable aligns with site specific terrain, objects, and geometry. The Trackable tethers the AR content (e.g., AR content uploaded to a server system by a user that is accessible to other users) to the real-world location, combining and blending the AR content with a live view of the world that can be viewed through an AR camera device, AR glasses, or other AR viewing system. The Trackable may be found nearby or in the vicinity of its assigned GPS location, but an expansive cache radius may be needed to encompass the Trackable, so that the Trackable that is cached before needing to be presented to the user via the mobile device (e.g., before the user sees the Trackable object or the apparent location of the AR content), taking GPS error into account. The AR content is presented at the correct position and orientation e.g., due to the use of local feature recognition, which locates and tracks the position of Trackable more accurately than GPS as a standalone geo-location service.

Figure 3:
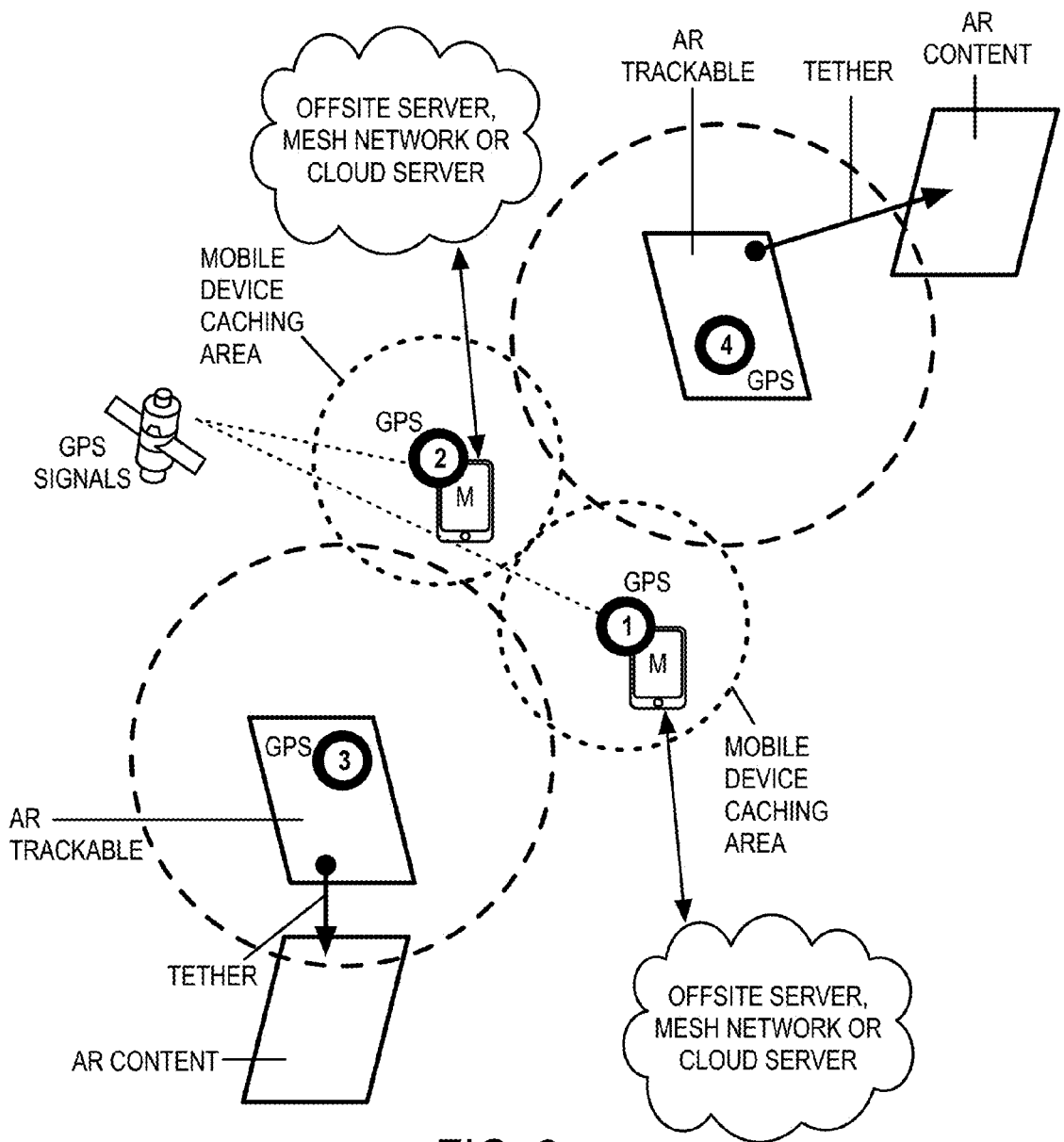
FIG. 3 is an overview diagram expanding FIG. 2 to cover the illustrative case of multiple MDDs and multiple Trackables.

FIG. 3 is an overview diagram expanding FIG. 2 to cover the case of multiple MDDs and multiple Trackables. In FIG. 3, multiple MDDs seek Trackables at various GPS locations. Multiple forms of AR content are tethered and attached to different Trackables which each have GPS-defined caching areas. Multiple mobile devices check the distances to the GPS coordinates (3 & 4) assigned to location-specific Trackables by using their own GPS (1 & 2) positions, as depicted in FIG. 3. As the mobile devices calculate the distances to the various Trackables, when any mobile device caching area intersects with a Trackable's caching area, the mobile device downloads the data for some or all of the AR content events that are tethered to the Trackable, as well as the data that enables the mobile device to identify and position itself in space relative to the Trackable.

Figure 4:
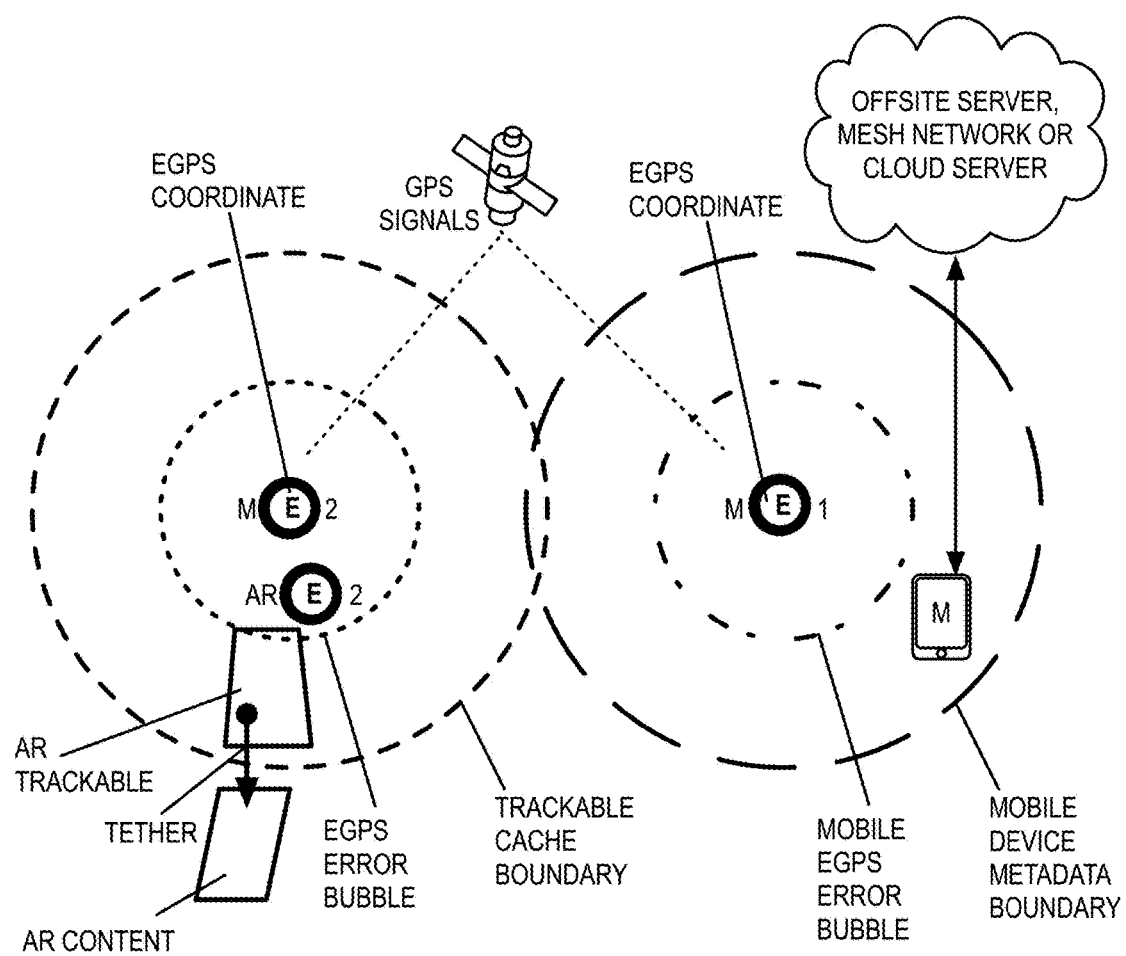
FIG. 4 shows a specific embodiment of FIG. 2, using a "MDD Metadata Area" rather than a "MDD Caching Area"; as well as an estimated GPS (EGPS) coordinates and their associated error areas to provide greater positioning accuracy.

FIG. 4 shows a specific embodiment of FIG. 2, using a "MDD Meta-data Area" rather than a "MDD Caching Area"; as well as an estimated GPS (EGPS) coordinates and their associated error areas to provide greater positioning accuracy. Note how a MDD is used as an EGPS data source to provide initial position data for the AR content. In FIG. 4, a MDD uses estimated GPS (EGPS) (e.g., a sensor-fusion approach that incorporates GPS) to check or otherwise determine distance to a Trackable. For example, the MDD checks a distances between points M E 1 and M E 2. Intersection of an MDD meta-data area with a Trackable cache area triggers download of Trackable and AR data. EGPS improves accuracy with repeated viewing from (and/or measurements performed by) different devices. In an example, EGPS is the device's best estimate of the actual GPS (WGS84) location of the device, calculated from multiple GPS readings, as well as the EGPSs of recently used Trackables. The Trackable's EGPS is the system's best estimate of the GPS location of the Trackable. This estimate is improved and updated based on further GPS estimates of the Trackable's position from devices that track or otherwise measure the Trackable. In FIG. 4, when the MDD's meta-data area intersects with the Trackable's caching area, the MDD queries a server system, and downloads the meta-data information about the Trackable. This information includes the Trackable's EGPS position, other associated areas (e.g., its caching area), COFIG data, and any other such meta-data.

Figure 5:
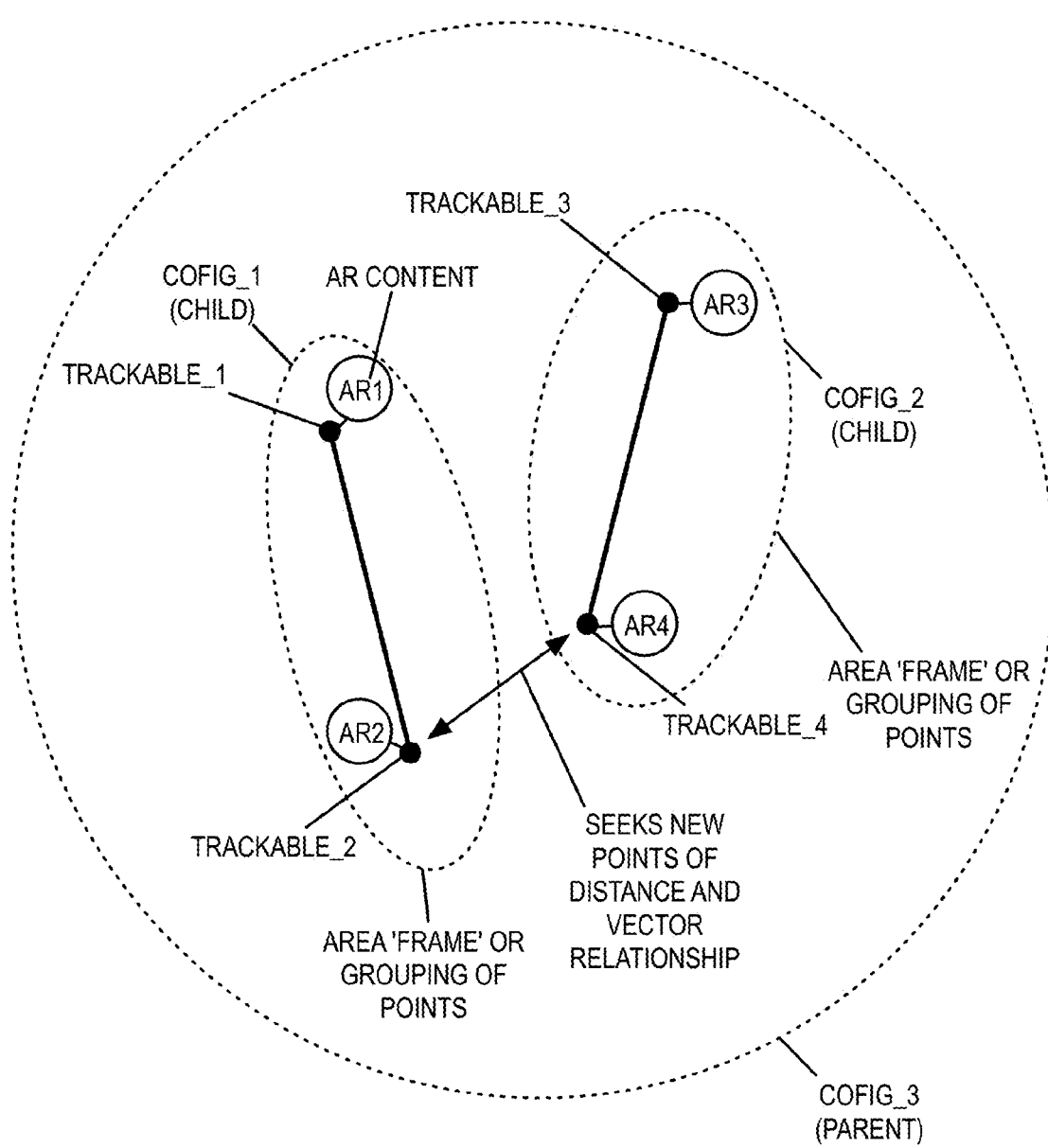
FIG. 5 is a diagram showing how AR content and the Trackables they are tethered to may be gathered into COFIG groups.

FIG. 5 is a diagram showing how AR content and the Trackables they are tethered to are gathered into COFIG (Coordinate Filter Improvement Groups) groups. COFIG groups link Trackables with relative position and direction data. Initially Trackables are unconnected. As MDDs traverse the world and view Trackables, the LockAR system adds and compiles the relative position and direction data, and COFIG groups are automatically created. This data initially has a high error component due to the uncertainty in the measurements (such as GPS or PDR). Subsequent measurements made by MDDs incrementally improves quality by applying a sifting statistical filter. As additional measurements connecting previous unconnected Trackables that already belong to COFIG groups, the COFIG groups are merged into a parent COFIG group (child COFIG group One and child COFIG group Two merge into parent COFIG group Three). In FIG. 5, COFIG groups assign coordinates to their child Trackables, which in turn describe the positions of those Trackables relative to each other. In an example, when a device makes a measurement between Trackables in two different COFIG groups, those two groups become children in a newly created COFIG group. Trackables have an uncertainty value associated with their COFIG coordinates. This value decreases as more measurements are made from that Trackable to another Trackable. When two or more COFIG groups are merged, the Trackables inside those groups are also merged into a new COFIG group. Trackables of the merged groups have (e.g., are assigned) COFIG coordinates based on the relative positions of the two or more merged COFIG groups, and the positions of the Trackables within those groups. In an example, once two child COFIG groups have low enough uncertainty (e.g., satisfying a threshold value) in their parent COFIG group coordinates (e.g., uncertainty between child COFIG groups), the child COFIG groups may be merged together. Over time, this process will eventually generate "top-tier" ancestral COFIG groups that have descendent Trackables existing worldwide. From the perspective of the end user, the COFIG system works automatically and is typically invisible to the end users.

Figure 6:
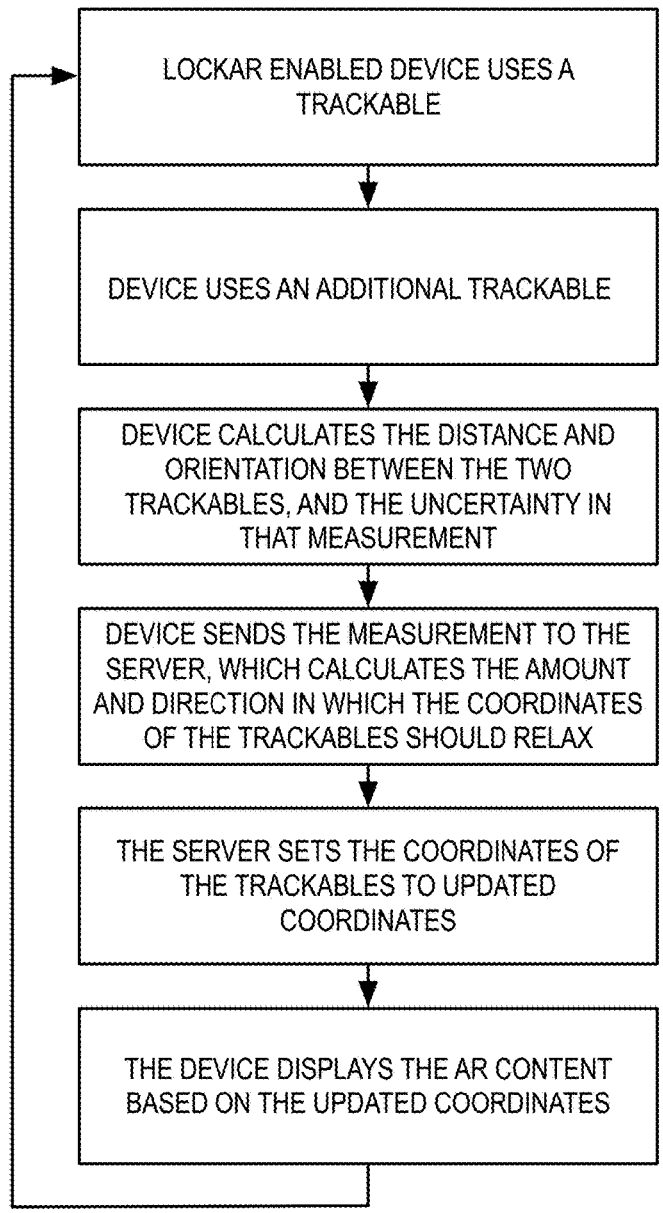
FIG. 6 is a flow diagram outlining how the MDD may refine COFIG data to more accurately position AR content.
Figure 7:
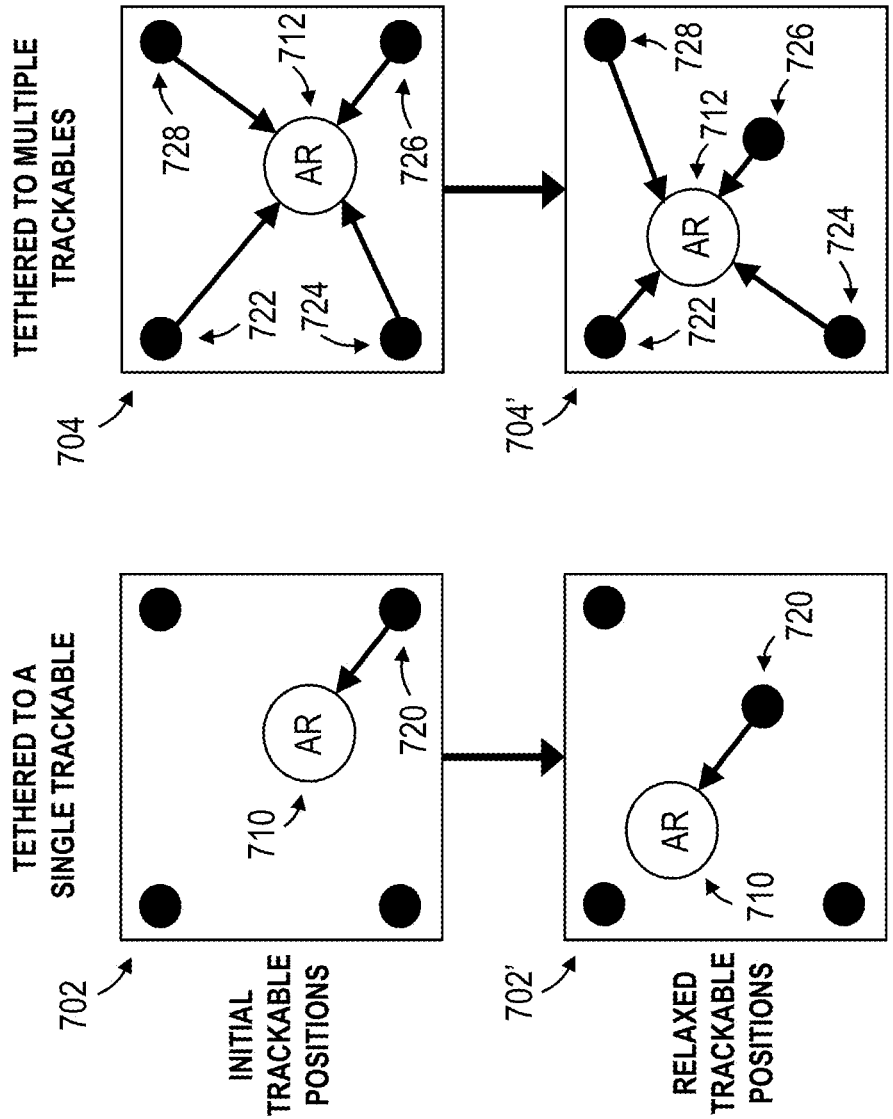
FIG. 7A shows how the LockAR system may refine COFIG groups' relative position data when AR content is tethered to a single trackable.
FIG. 7B shows how the LockAR system may refine COFIG groups' relative position data when AR content is tethered to multiple trackables.

FIG. 6 is a flow diagram outlining an example of how an MDD (or MDD in combination with a server system) refines COFIG data to more accurately position AR content. In FIG. 6, when using multiple Trackables to tether AR content, the Trackables can be chosen manually or automatically (e.g., programmatically). If the Trackables are chose automatically, the device chooses e.g., the four Trackables whose positions have the greatest confidence (e.g., least uncertainty) from the perspective of the device. The Trackables' positions and orientations and uncertainties may be stored in association with the AR content or within AR data. The Trackables relax over time relative to each other in COFIG space, as depicted in FIG. 7A-7B using the approach depicted in FIG. 6, thereby improving the accuracy of their relative positions, as well as the accuracy of their positions in EGPS space. Two points relax relative to each other when a device uses them (or references them), making a measurement of the distance between the two Trackables. This measurement may be based on the estimate distance to each Trackable that is viewed or otherwise measured by the device, as well as the distance travelled by the device between the Trackables (e.g., calculated using EGPS and other techniques such as PDR). As the positions of the Trackables relax, the position of the AR content in COFIG and global coordinate space changes. The new COFIG and global coordinates may be calculated by taking an average, weighted by uncertainty, of the coordinates the AR content should be at, relative to each of the Trackables the AR content is tethered to, individually. This approach improves the accuracy of the placement of AR content.

FIGS. 7A and 7B show how the LockAR system refines COFIG groups' relative position data. Each measurement adds a new connection or refines existing one. As a connection is improved, it may also alter some or all connections within the COFIG group. Within a COFIG group all connections are somewhat elastic.

FIG. 7A shows the positions of four Trackables within one COFIG, and FIG. 7B shows the positions of four other Trackables within another COFIG, to illustrate two different situations. COFIGs 702 and 704 represent the initial states of two COFIG groups, each containing four Trackables. Of interest are Trackable 720 of COFIG 702 and Trackables 722, 724, 726, and 728 of COFIG 704.

With continuing reference to FIGS. 7A and 7B, COFIGs 702' and 704' represent the same COFIG groups containing the same Trackables, at a later point in time, of which Trackables 720 and 726 respectively, have "relaxed" into a more accurate COFIG position relative to the three other Trackables. COFIGs 702 and 702' represent a COFIG group wherein an AR content item 710 is tethered only to Trackable 720 (i.e., a single Trackable). At 702', when Trackable 720 undergoes relaxation, the position and orientation of AR content 710 relaxes in a manner corresponding to that Trackable within the COFIG group. For example, the change in positioning of AR content 710 may be identical to the relaxation-induced change in positioning of Trackable 720.

COFIGs 704 and 704' represent a COFIG group wherein AR content 712 is tethered to multiple Trackables, in this case all four Trackables 722, 724, 726, and 728. At 708, when the position of Trackable 726 relaxes relative to Trackables 722, 724, and 728, the position and orientation of AR content 712 in the COFIG group changes significantly less than was the case with AR content 710. This new position may be the weighted average of the positions and orientations AR content 712 would have if it were tethered to each of the Trackables 722, 724, 726, and 728 separately. These weights may correspond to the relative uncertainty in the positions and orientations of Trackables 722, 724, 726 and 728. In some examples, the weights may be the current relative uncertainty multiplied by the uncertainty in the position of Trackables 722, 724, 726, and 728 relative to the user's device when AR content 712 was last positioned. These weights may exist separately for each component of the Trackable position and orientation, and so the weighted average for each component may be calculated separately.

Figure 8:
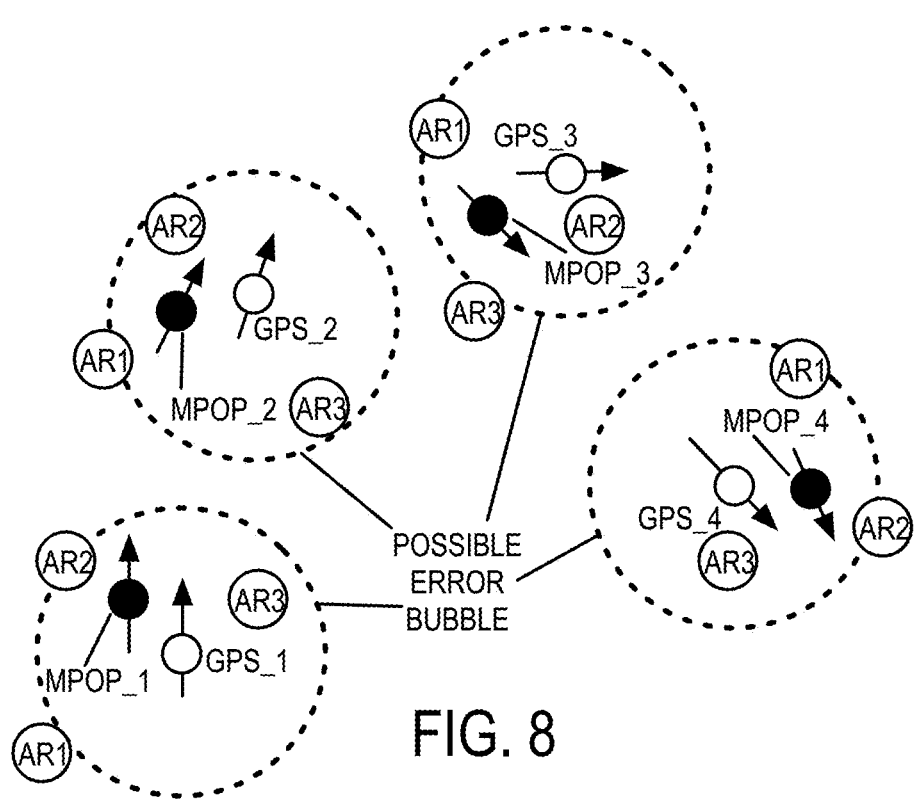
FIG. 8 is an overview of MPOPs, including an illustrative method of associating a COFIG group to a moving position.

FIG. 8 is an overview of Mobile Position Orientation Points (MPOPs), a method of associating a COFIG group to a moving position. FIG. 8 depicts how MPOP data is gathered and distributed, and how MPOPs can be used to properly align and orient Trackables and the associated AR content that move positions. It shows how an MPOP takes into account EGPS coordinates, as well as Error Areas when used to position AR content. An MPOP is a type of top-tier COFIG group that gives GPS coordinates to its descendent Trackables, by using one or more GPS beacons as reference points. This allows Trackables and their associated surrounding areas to be created and used, even if the Trackable is located on, or is itself, a moving object. The MPOP can use a layer of filtering and predictive processing to increase the accuracy of, and decrease the uncertainty in, its EGPS position. When the MPOP assigns EGPS coordinates to a Trackable, those EGPS coordinates have an uncertainty equal to the MPOP's uncertainty, plus the Trackable's uncertainty in its position in MPOP space. This allows the Error Areas of Trackables in an MPOP to increase and decrease dynamically in response to an event that alter the MPOP's uncertainty in its EGPS position, such that the GPS being temporarily offline, malfunctioning, or having temporarily high error caused by the "canyon effect". In FIG. 8, an MPOP is depicted with three Trackables associated with the MPOP at four different points in time. At each of these points in time, FIG. 8 shows the EGPS position and direction of the MPOP, the GPS position and direction from the GPS beacon, the EGPS positions of the three associated Trackables, and the uncertainty in the MPOP's EGPS position visualized as an error area or bubble.

Figure 9:
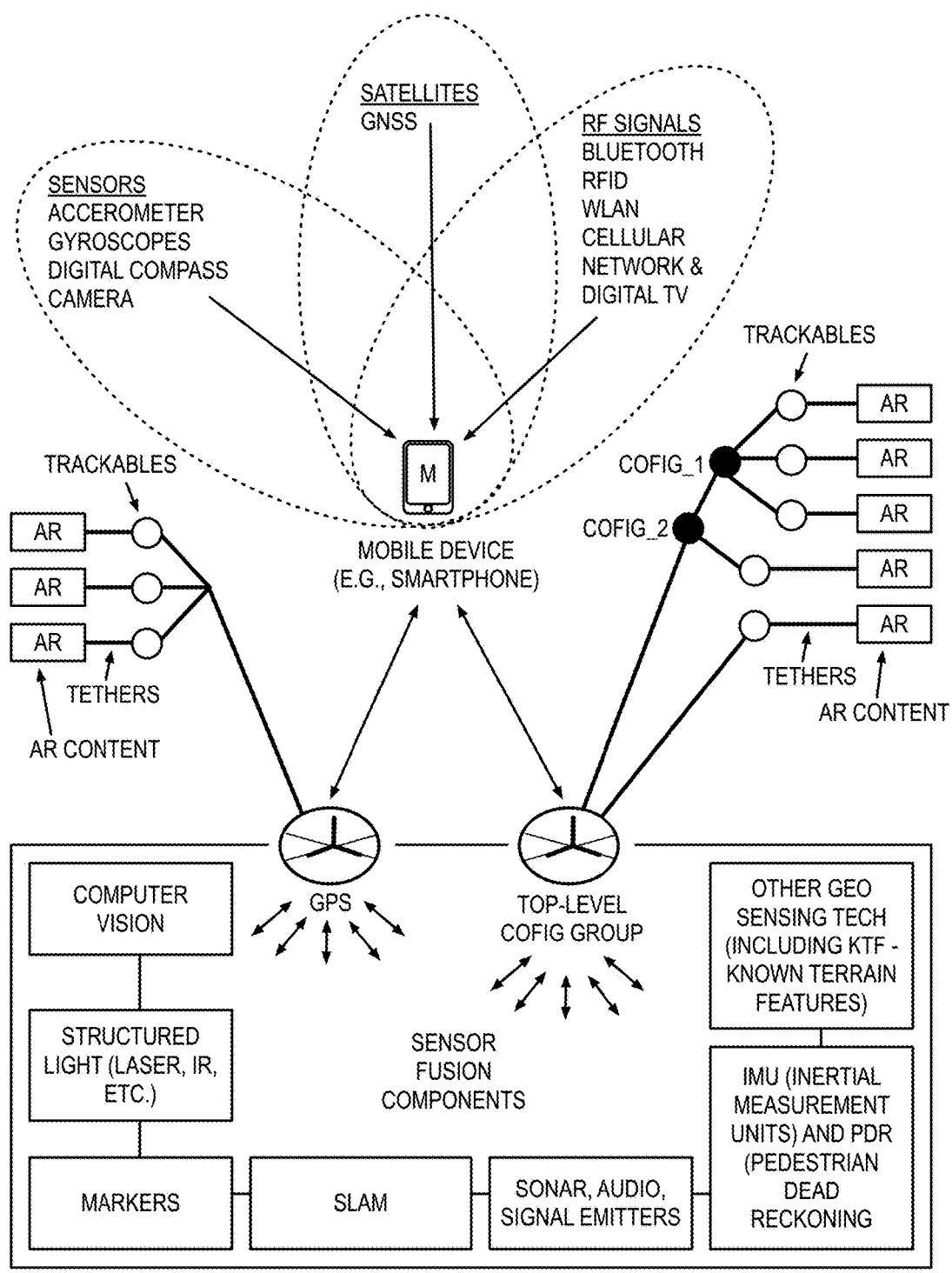
FIG. 9 is a diagram showing how LockAR may use a myriad of illustrative sensors in concert to achieve sensor fusion.

FIG. 9 is a diagram showing how LockAR uses a myriad of sensors in concert to achieve sensor fusion. It shows how various inputs and input types can be used with one another, and cross-compared to achieve an accurate understanding of its location, from which Trackables can be placed and followed, allowing for the accurate positioning and orientation for AR content. MDDs use global coordinate system, Trackables, and COFIG groups together in combination to increase the accuracy of AR content placement. A simple implementation of this approach is to use whichever technique has the lowest uncertainty in the position at any given time. A more complex approach may involve a processing layer (such as Bayesian Network), or adapting an updating technique, to combine the sensor inputs using sensor fusion to get position information that is more accurate and certain than would have been possible with the use of a single technique.

LockAR can use multiple sensor inputs in concert to achieve sensor fusion, which significantly improves positioning accuracy. FIG. 9 illustrates an example of how LockAR utilizes sensor fusion. The MDDs can collect positioning data using various technologies. For instance, a smartphone may collect data from an accelerometer, a gyroscope, a digital compass, a smartphone camera, GNSS satellite, RFID chip, NFC chip, Bluetooth component, WLAN component, cellular network component, COFIG, EGPS, computer vision, structured light, fiducial markers, SLAM, sonar, signal emitters, pedestrian dead reckoning, other geometry sensing technology, and/or a digital TV component. These input data can be cross-compared to improve the positioning accuracy and robustness. For instance, a processing layer (e.g., a Bayesian Network) can combine the sensor input data using sensor fusion to get positioning information that is more accurate than would have been possible by relying on only one technology. This improved positioning information results in better COFIG and EGPS accuracy.

Figure 10A:
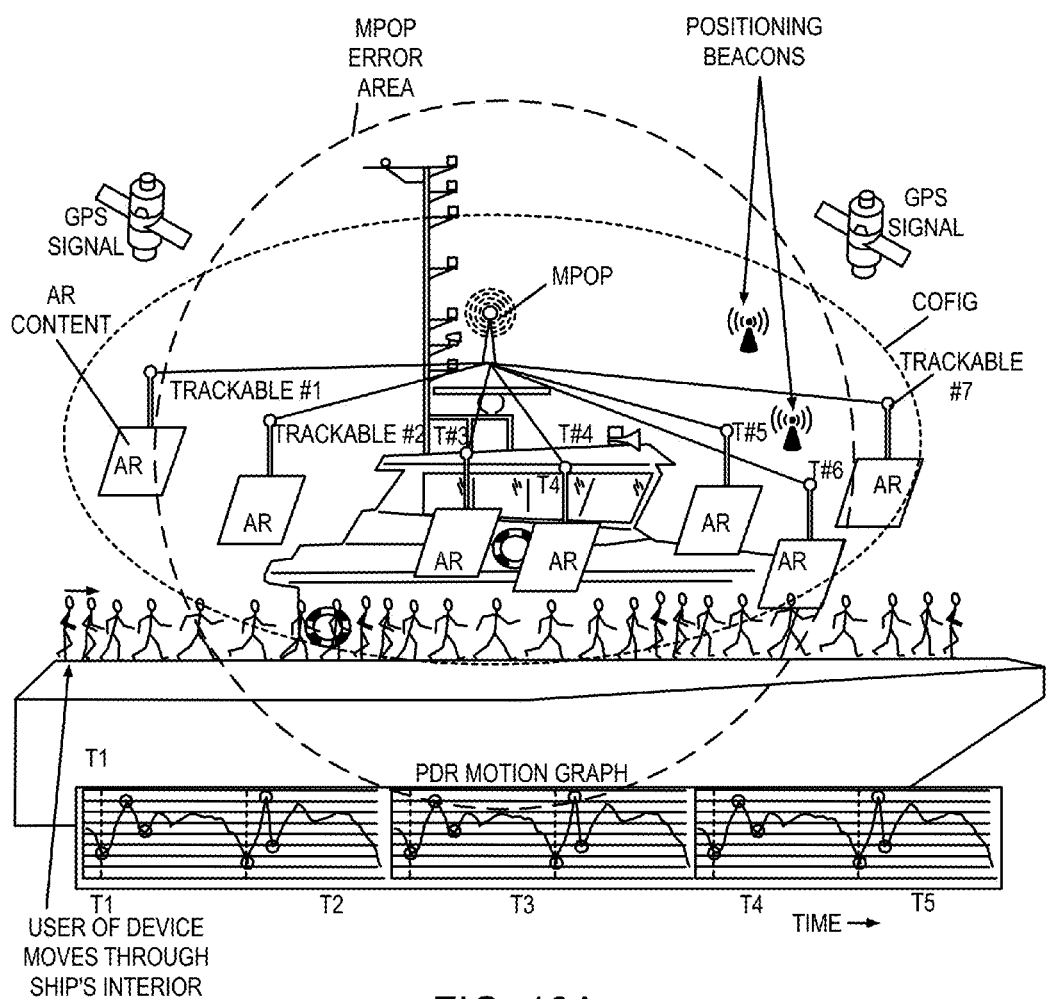
FIGS. 10A and 10B are diagrams showing a complex illustrative use case of multiple pieces of AR content in a COFIG group, being displayed to a user moving through the space.
Figure 10B:
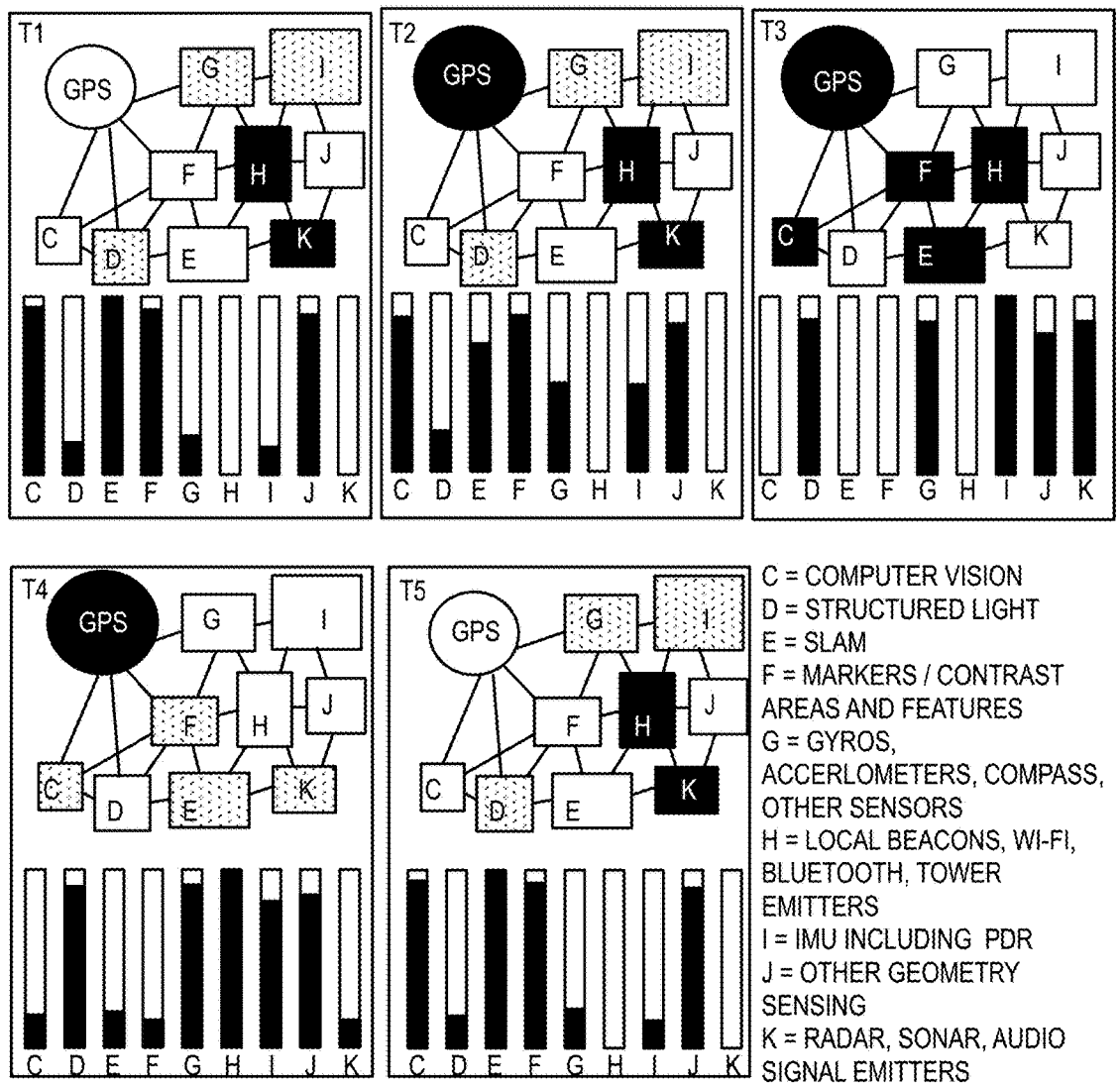

FIGS. 10A and 10B are diagrams showing a complex use case of multiple pieces of AR content in a COFIG group, being displayed to a user moving through the space. It also shows how LockAR uses a multitude of sensors and their associated measurements to accurately position this AR content, and how the overall sensor matrix adapts to the given environment. It also shows how an MPOP can be used to align the COFIG group containing the Trackables tethered to AR content with a moving object, in this case a ship. In FIGS. 10A and 10B, MPOP is depicted in combination with sensor fusion. The MPOP has child Trackables for which the MPOP continually or periodically updates the EGPS of each child Trackable. A PDR motion graph is depicted in FIG. 10A for a user of a mobile device moving relative to the ship. FIG. 10B depicts examples of sensor confidence values at various points in time linked to the PDR motion graph and position of the user in FIG. 10A. At T1, GPS, CV, SLAM, and Markers all have high confidence values. At T2, Computer Vision, SLAM, Markers, IMU, and PDR have high confidence values, and GPS has a low confidence value. At T3, in the poorly-lit interior of the ship, PDR, IMU, Sonar, and structured light have the highest confidence values. At T4, in the poorly-lit interior of the ship, PDR, IMU, Sonar, structured light, and positioning beacons have the highest confidence value. At T5, GPS, CV, SLAM, and Markers have high confidence values.

Figure 11:
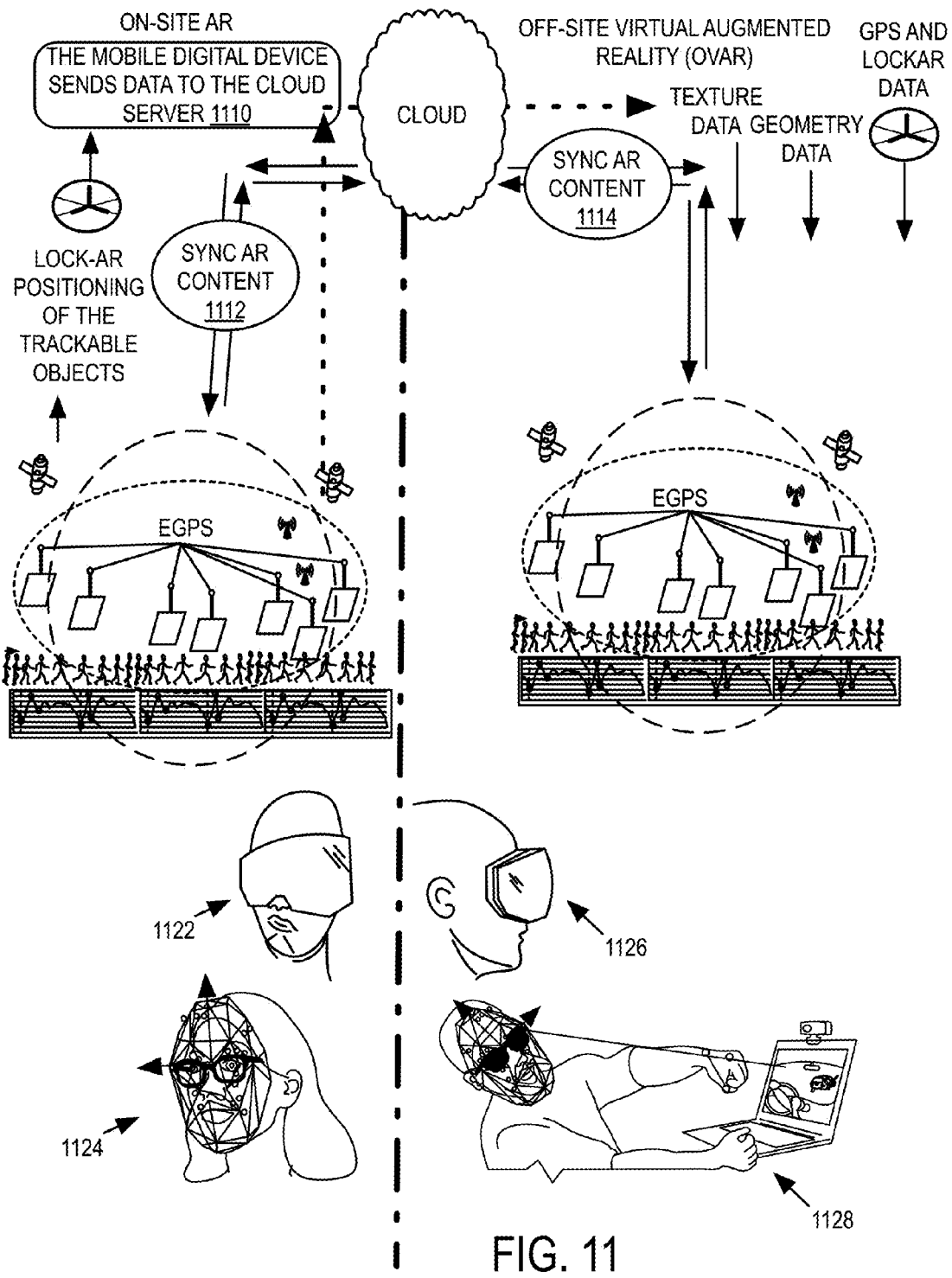
FIG. 11 is a diagram that shows how LockAR may integrate with offsite virtual AR to create and enhance location and positional data in a virtual space, aligning it as close as possible to the onsite experience.

FIG. 11 is a diagram that shows how LockAR may integrate with ovAR to create and enhance location and positional data in a virtual space, aligning it as close as possible to the onsite experience. It also briefly details suitable offsite digital devices (OSDDs), as well as alternate methods of input, both onsite and offsite, for the AR application. Within FIG. 11, as LockAR data is synchronized between onsite and offsite devices, ovAR uses that data to more accurately represent the onsite location. This data can be synchronized both in real-time or later, asynchronously. At 1110, the MDD sends data to the cloud server. This data may include geometry data (acquired using methods such as SLAM or structured light sensors), as well as texture data, and LockAR positioning data, which may be calculated from GPS, PDR, gyroscope, compass, and accelerometer data. At 1112 and 1114, AR content is synchronized, by dynamically receiving and sending edits and new content. As indicated at 1122 and 1126, other possible onsite and offsite digital devices include, but are not limited to AR devices, VR devices, and heads-up-display (HUD) devices. As indicated at 1124 and 1128, various digital devices, sensors, and technologies, such as perceptual computing and gestural interfaces, can be used to provide input to the AR application. The application can use these inputs to alter or control AR/VR content and avatars, in a way that is visible to all users of the AR or VR platforms. These devices may also be used to provide input to ovAR.

LockAR is a method of tying AR to a physical location with significantly more accuracy than ever before. It uses GPS as well as trackable features of the environment ("Trackables") to position the AR content, using technology such as fiducial markers and SLAM (Simultaneous Location and Mapping). In addition, LockAR gradually increases the accuracy of the position of AR content over time by learning the relative positions of Trackables through feedback from users' devices. Finally, LockAR allows for the placement of AR content on moving objects in a global coordinate system (GPS), by using a global coordinate system technology (GPS signals) to estimate the position and orientation of the object.

Details Regarding LockAR Features

With continuing reference to FIGS. 1-11 and the accompanying description above, additional details regarding features of the LockAR system will now be described.

Point Creation

In some examples, point creation begins when a user's device recognizes a new trackable feature it wants to use. It then records the data that would enable a mobile computing device to identify the feature and calculate the feature's position relative to the mobile device, as well as the feature's estimated GPS coordinates. This data turns the feature into a "Trackable." Trackables may also be generated from third-party data. If the user's device hasn't tracked another Trackable recently, it places the Trackable into a new Coordinate Filter Improvement Group (COFIG group). If the device has recognized other Trackables recently, it places the new Trackable into a COFIG group that contains whichever recently-seen Trackable has the lowest positional uncertainty. It then sends the Trackable's data to an external server where it is stored. When the GPS coordinates of a Trackable are estimated by a device, that device takes its current GPS reading, as well as its previous GPS readings, and determines how erratic the GPS in this area is (for instance, by measuring the standard deviation of the data). If the device has tracked any previously recorded Trackables it takes their estimated GPS positions into consideration (The device determines the likely error in these estimated GPS positions by taking into account, how erratic the dead reckoning is, how long the dead reckoning has been running, any algorithmically generated or manually set uncertainty weights, as well as the error in the perceived position of the object when it was tracked). This gives it estimated GPS coordinates, as well as an uncertainty value, (which can be represented as a standard deviation, with a higher standard deviation representing more uncertainty). The confidence value in a datum or measurement can be calculated by taking the inverse of the uncertainty value. One alternative way of storing an uncertainty value would be as the percent chance that the actual value is within a confidence interval, which assuming a normal distribution, can be freely converted to a standard deviation plus a mean value and back again. It is also possible that the uncertainty value could be stored as several values, i.e., the uncertainty in the uncertainty could be part of the uncertainty value. Also, the uncertainty in the uncertainty could be represented, for instance, as the number of samples represented by the distribution, weighted accordingly.

Relaxation and Uncertainty Updates

When two points are both within the same COFIG group, they have COFIG coordinates, which positions and orients each Trackable relative to others using latitude, longitude, and altitude as well as yaw, pitch, and roll. If a user's device looks at one Trackable, it estimates how far away it is, in what direction it is, and what orientation it is in relative to the device. The device then remembers where that Trackable is as the device is moved around, either by visually tracking it, or by using pedestrian dead reckoning (PDR) technologies and GPS. Then, when the device begins tracking a second Trackable, it estimates the distance, direction, and orientation of that Trackable, and calculates the second Trackable's estimated position. Given this information, the device can calculate an estimated distance and orientation between the two Trackables, and can send this information, as well as the uncertainty in the information's accuracy, to the server. The server then uses this measurement to "relax" the COFIG coordinates of both points, so that the distance between the two COFIG coordinates, as well as the relative COFIG orientations of the Trackables, becomes closer to the device's estimate of those values. Trackables can also be defined to exist in an area. An example of a Trackable defined in an area could be human faces or bodies with facial recognition, this Trackable could also be in an MPOP tied to the person's phone. In the case of a movable Trackable that is defined to exist in an area, the measurement between it and another Trackable cannot be used to determine the specific position of the other Trackable, meaning the second point does not always relax. The amount the coordinates change upon relaxation is dependent on both the uncertainty value of the device's measurement of the distance between, and the relative orientation of, the two Trackables, as well as the uncertainty values for their COFIG coordinates.

The lower the uncertainty in the COFIG coordinate before the measurement, the less that COFIG coordinate will move, and the lower the uncertainty in the measurement, the more the COFIG coordinate will move. The larger the difference between the actual measurement and what the COFIG coordinates predict the measurement should be, the more the COFIG points will move. After the coordinates update, the uncertainty values will also update. If the measurement was close to what the COFIG group predicted it should be, then the uncertainty value of the updated COFIG points will be lower. In this case, the lower the uncertainty in measurement, the lower the updated COFIG uncertainty will be. Conversely, if the measurement is far from what the COFIG group predicted it would be, then the uncertainty in the updated COFIG points will be higher than they were previously. In this case, the lower the uncertainty of the measurement, the higher the uncertainty in the result, except for when the measurement confidence is significantly higher than the COFIG confidence.

Figure 12:
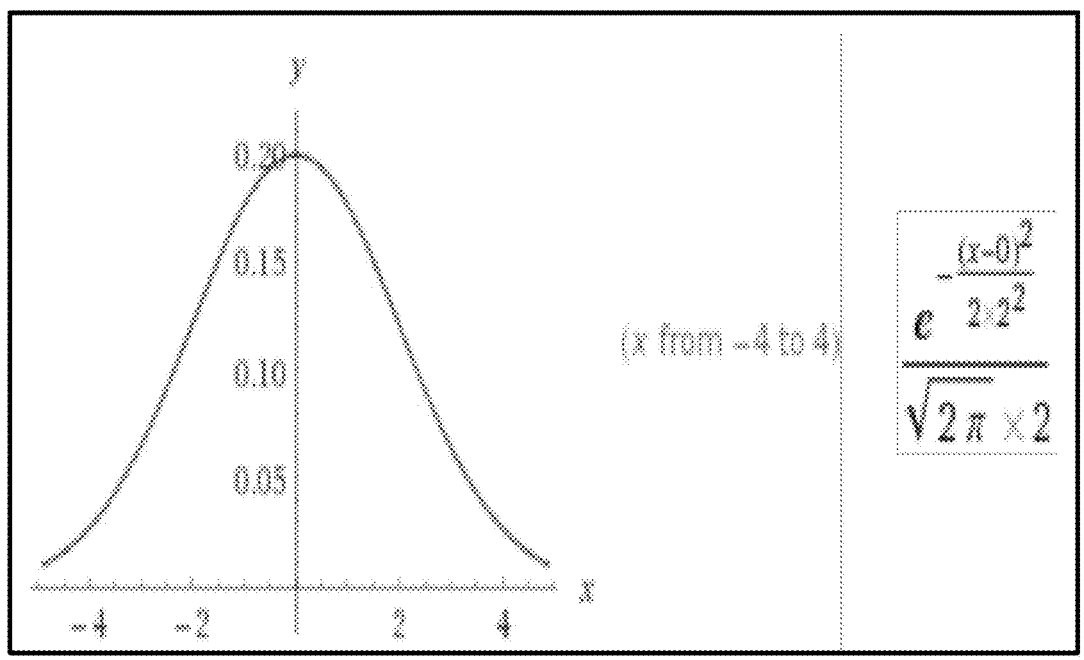
FIG. 12 depicts an illustrative first mathematical relationship described further below.

An example embodiment of uncertainty updates (which does not strictly follow the parameters set in the above paragraph, as the uncertainty is always decreased) would use Bayesian analysis, taking the Gaussian distribution of an initial point as the prior probability, a Gaussian distribution of a second point as the likelihood function, and the resulting posterior Gaussian distribution giving an updated point and uncertainty value. Bayesian analysis says that the posterior distribution $p(\theta|y)$ is equal to the prior distribution $p(\theta)$ times the likelihood function $p(y|\theta)$ divided by the integral of $p(\theta)$ times $p(y|\theta)$ over the entire range of the distributions, which in this case is negative infinity to infinity. Each dimension of the point can also be calculated individually, with its own uncertainty value. For instance, a point A with a value (mean) in the x dimension of 0, and a standard deviation of 2, has a Gaussian distribution such as depicted in FIG. 12.

Figure 13:
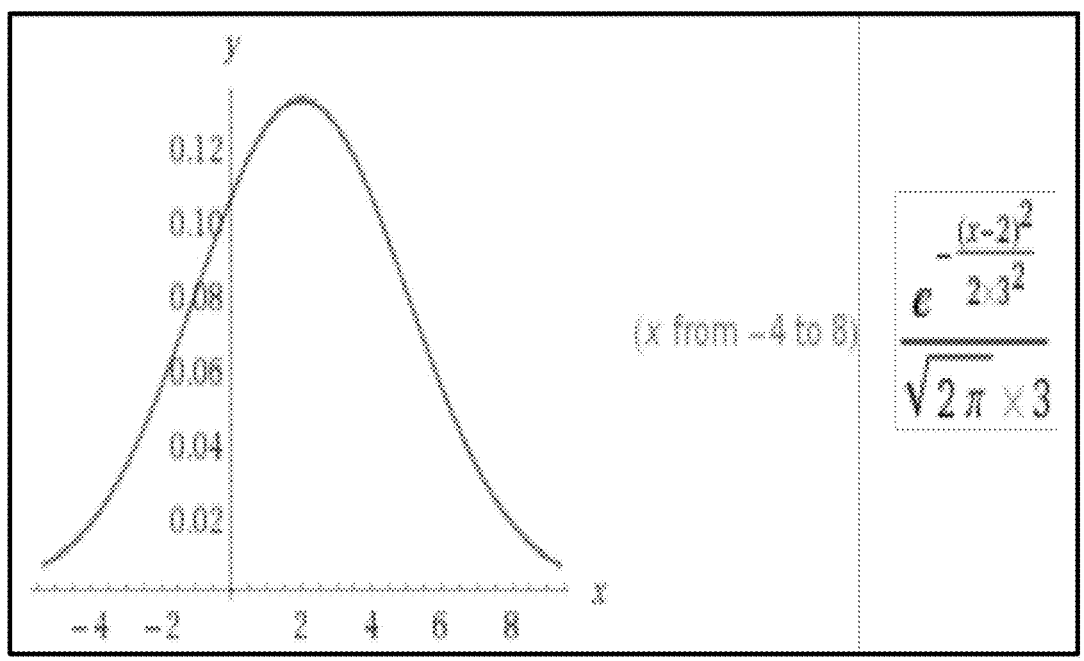
FIG. 13 depicts an illustrative second mathematical relationship described further below.
Figure 14:
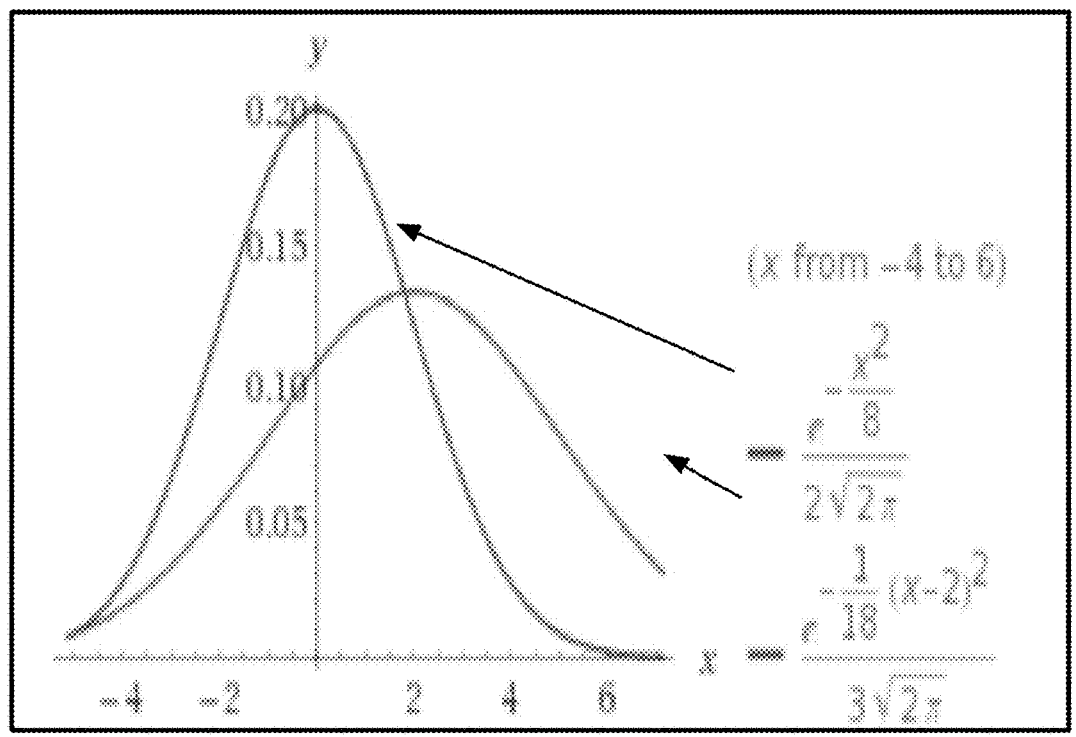
FIG. 14 depicts an illustrative third mathematical relationship described further below.
Figure 15:
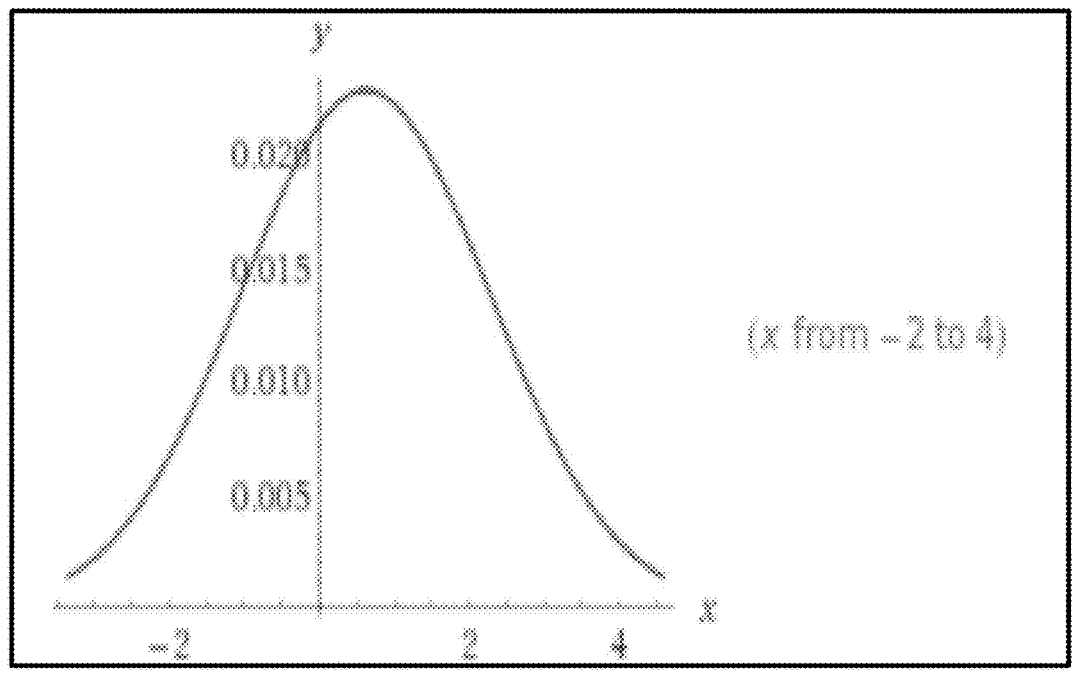
FIG. 15 depicts an illustrative fourth mathematical relationship described further below.
Figures 16, 17:
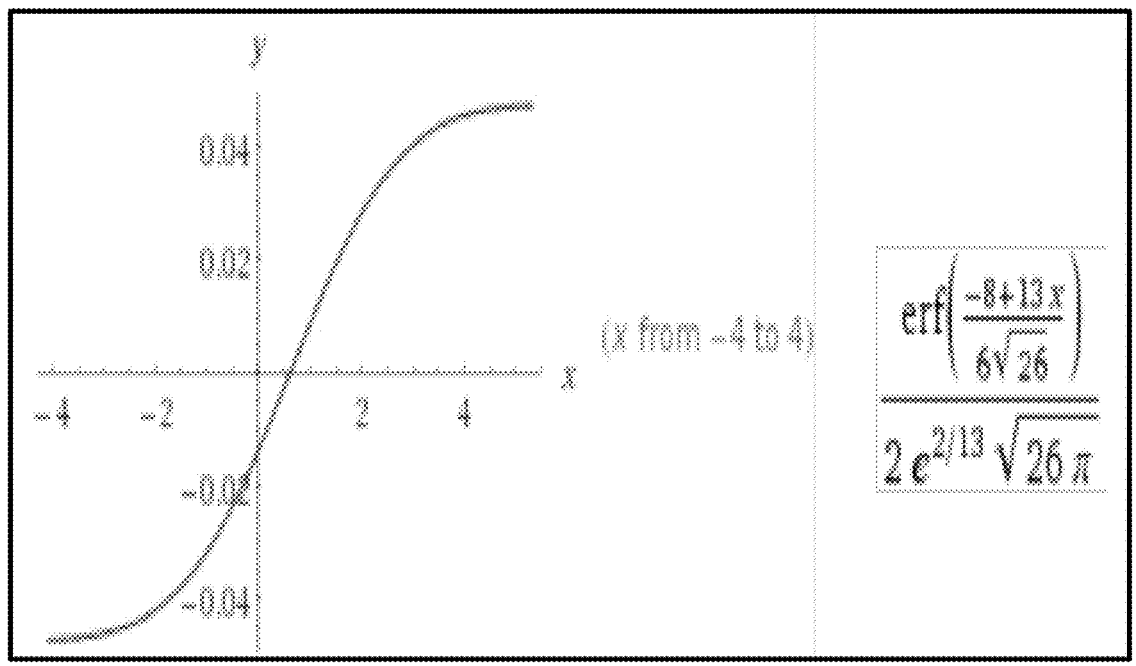
FIG. 16 depicts an illustrative fifth mathematical relationship described further below.
FIG. 17 depicts an illustrative sixth mathematical relationship described further below.
Figures 18, 19, 20:
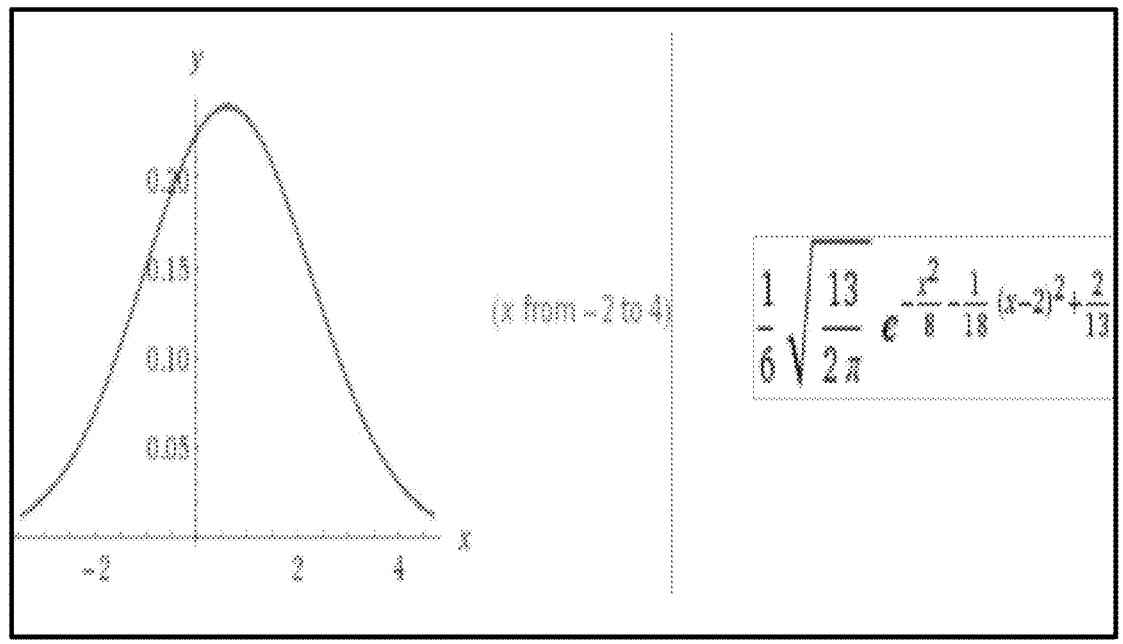
FIG. 18 depicts an illustrative seventh mathematical relationship described further below.
FIG. 19 depicts an illustrative eighth mathematical relationship described further below.
FIG. 20 depicts an illustrative ninth mathematical relationship described further below.
Figure 21:
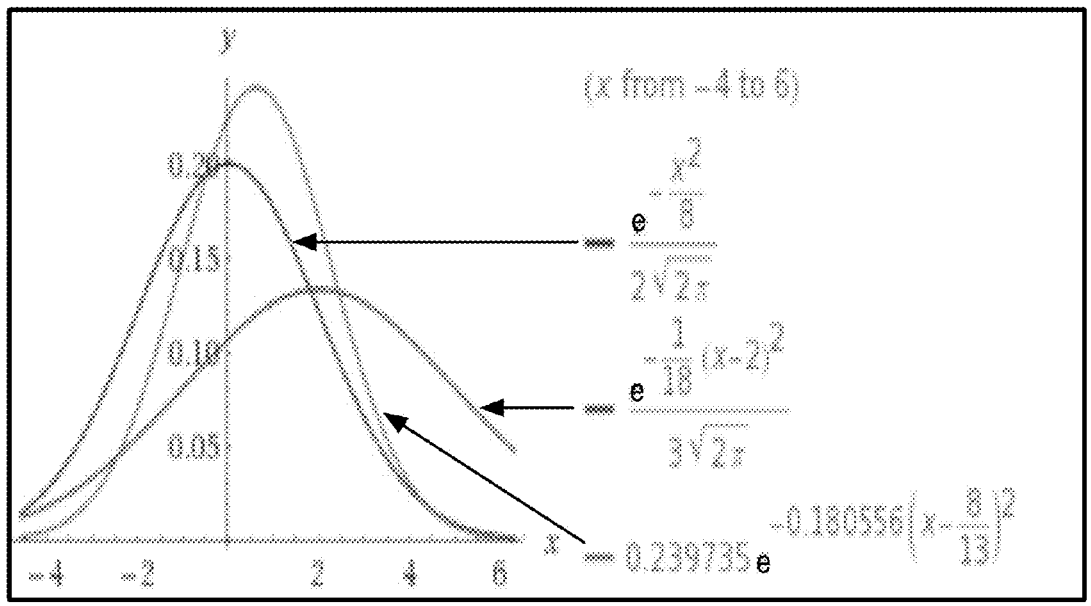
FIG. 21 depicts an illustrative tenth mathematical relationship described further below.

An update to that point, with a predicted x value of 2, and a standard deviation of 3, has a Gaussian distribution as depicted, for example, in FIG. 13. Both distributions plotted on the same axis, may be as depicted, for example, in FIG. 14. The distributions, when multiplied, result in a distribution such as depicted in FIG. 15, for example. This resulting distribution is notably not Gaussian, as the probabilities do not sum to one. The integral of this distribution is depicted in FIG. 16. As the erf( ) function has a limit of −1 and 1 as it goes to negative infinity and infinity respectively, this integral will have the value over its entire range be equal to the representation depicted in FIG. 17. This provides a posterior distribution as depicted, for example, in FIG. 18. This posterior distribution can be re-written as depicted in FIG. 19. This distribution has a "value" of 8/13 (0.61538 . . . ) and a standard deviation of the function or value depicted in FIG. 20 −(1.6641 . . . ). Graphing all three of the Gaussians on the same axis is depicted in FIG. 21. The updated distribution (green line) has a smaller standard deviation, and therefore a lower uncertainty value for its value of 8/13 for the x coordinate of the point.

This formula depends on having accurate uncertainty values for the measurements involved. The most basic way to generate these values is by combining the uncertainties of all the measurements taken by the device. For example, as a device is being moved, a reading is made of its accelerometer which has an uncertainty value attached to it. As the device continues to move it keeps a running tally of the total distance traveled by summing all of the accelerometer readings. It also keeps a running tally of the uncertainty value of the total distance traveled, by combining all of the uncertainty values associated with accelerometer readings. When measuring uncertainties with standard deviations, this is done by summing the numerical values of all the standard deviations calculated. This means if standard deviation A is 4.5 and standard deviation B is 5.5, then the total standard deviation would be 10. More sophisticated methods can also be used such as dynamic Bayesian networks or Kalman filters, which can reduce the uncertainty in the total measurement, as well as synthesize input from multiple sensors (AKA. "sensor fusion") and provide an uncertainty value for the resulting value.

The uncertainty value assigned to a reading of a sensor can come from many sources. One way is to manually set the uncertainty to a value obtained experimentally from testing the sensor. Another way is to use the value already provided by the sensor and the sensor's accompanying software, which may vary depending upon environmental conditions. An example of this would be a marker recognition program knowing that marker detection is worse under certain lighting conditions, and therefore giving a higher uncertainty value to its measurements when it knows the marker is in less optimal lighting. A third way to set the uncertainty value is to input experimentally derived rules, e.g., "marker recognition is more uncertain in poor lighting", and to have the application calculate the uncertainty value from these rules on the fly. The fourth way is to algorithmically determine the precision of a sensor. This can take the form of a temporary adjustment of uncertainty when a sensor is performing poorly, or of a per-device calculation of how precise a sensor has been so far, or of a shared value using data from all devices with that sensor. This precision can be calculated by: how accurate the sensor or program is relative to itself, how accurate it is relative to other sensors or software on the device, and how accurate the sensor's measurements are relative to other device's measurements about the environment. In this case, when a device measures the distance of two points in a COFIG group, not only does the point update its values and their uncertainties, but the device updates the uncertainty values of its sensors as well.

COFIG Groups

COordinate Filter Improvement Groups (COFIG groups), are groups that can be composed of both Trackables and other "child" COFIG groups, and store their positions and translations relative to one another in a coordinate system. In COFIG groups that contain Trackables, each Trackable has a COFIG coordinate and orientation assigned to it, with the distance and relative orientation between the COFIG coordinates of two Trackables in the group approximating the distance and relative orientation of those two Trackables in real life.

This approximation is the result of the COFIG coordinates of the Trackables relaxing relative to each other over time as devices measure their relative positions. The higher the number of measurements recorded, the higher the accuracy of the relative positioning will be. COFIG groups can also function recursively, containing other child COFIG groups. In this case, the child COFIG groups have COFIG coordinates and orientations (each with uncertainty values) assigned to them. These COFIG coordinates and orientations translate the coordinates and orientations of the elements inside the child COFIG groups, so that the approximate relative positions of these elements can be calculated inside the "parent" COFIG coordinate system.

COFIG Coordinates and Orientation for Trackables are Made Through Relaxation

Initially, when a COFIG group is made, it assumes that the coordinates and orientations of its elements exist in the global frame, which is commonly, though not necessarily, the GPS coordinate system. However, when a device makes a measurement between Trackables that are elements of two different COFIG groups, this changes. If both COFIG groups are not already elements in a larger, parent COFIG group, then they create a new parent COFIG group, which has both of the child COFIG groups as elements, and uses the measured relative position and orientation between the two Trackables to calculate the relative positions and orientations of the two child COFIG groups inside the parent COFIG space. The uncertainty value for these positions and orientations is calculated from the uncertainty values of the positions and orientations of the Trackables inside the child COFIG groups, as well as the uncertainty value of the measurement. One way to do this would be to add the uncertainties for each dimension together, and have those become the uncertainties for each dimension of the position and orientation of the child COFIG groups.

As COFIG groups can be elements of other COFIG groups, it is possible for them to form a hierarchy with a tree-like structure. This hierarchy can have rules for merging COFIG groups, merging the contents of a COFIG group into a higher or lower COFIG group, and rebalancing. Because there is a hierarchy, it is possible for a Trackable inside a child COFIG group to have a measurement taken, giving its relationship to a Trackable inside a different child COFIG group, but within the same "ancestral" COFIG group. Calculating the expected measurement and the uncertainty in that expectation is done by traveling up the tree from each Trackable to its parent COFIG group to that COFIG group's parent COFIG group, and so on; transforming the Trackable's coordinates, orientation, and uncertainty into the parent COFIG group by adding its position, orientation, and uncertainty to the position, orientation, and uncertainty of the child COFIG group it is in. This continues until the two Trackables have their relative positions, orientations, and uncertainties inside their lowest common ancestor COFIG group, where they can be compared.

Figure 22:
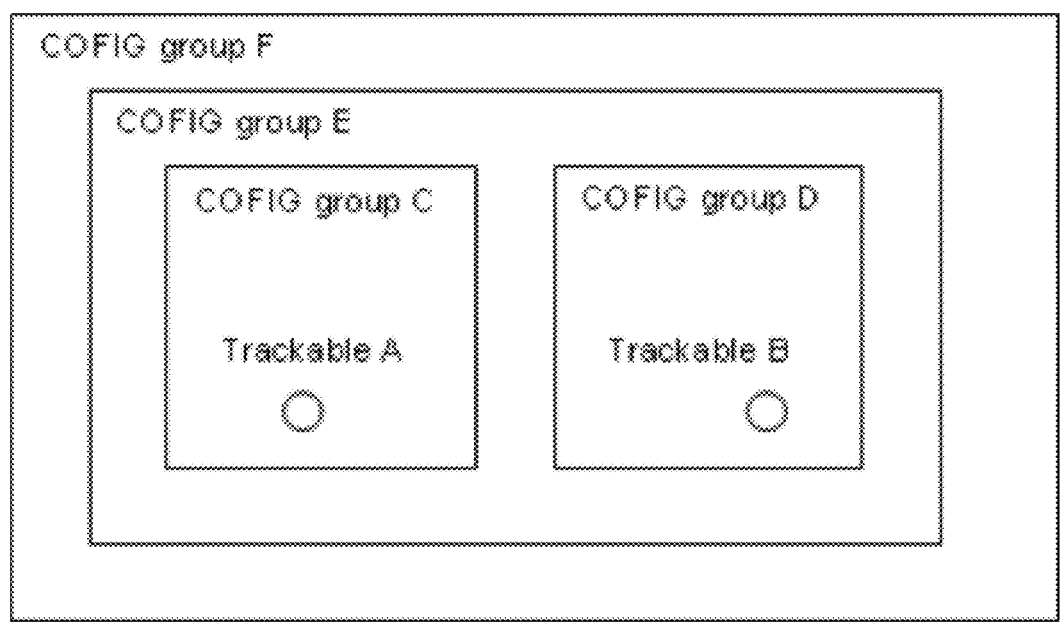
FIG. 22 depicts an example of COFIG groups having a hierarchical structure.

In the example above, there are several possible procedures to implement updates to the positional data (the list that follows in not exhaustive). The simplest is to find the lowest common ancestor COFIG group they are both a part of, treat the measurement taken as a measurement between their respective child COFIG groups within that ancestor COFIG group, and update those child COFIG groups' relative positions, orientations, and uncertainties accordingly. For instance, in FIG. 22, the lowest common ancestor COFIG group between Trackables A and B would be COFIG group E.

If a measurement was made between Trackables A and B, COFIG groups C and D would have their positions and orientations changed. A slightly more sophisticated implementation would be to calculate the suggested change to the position, orientation, and uncertainty of both Trackables, and then distribute these changes evenly amongst all COFIG groups in the paths from the Trackables up to, but excluding, the lowest common ancestor COFIG group.

These changes take into account the change in orientation as you go down COFIG levels. An even more sophisticated approach would be to distribute these changes along the paths of COFIG groups weighted according to the inverse of the uncertainty in those COFIG groups, possibly weighting each dimension individually. For instance, in the diagram above, if there was a needed change in the x dimension of +14 for Trackable A, Trackable A had an uncertainty of 5, and COFIG group C had an uncertainty of 2, then their inverses would be 0.2 and 0.5, making their share of change 0.2/0.7 (0.2857 . . . ) and 0.5/0.7 (0.7142) respectively This means that Trackable A's x dimension value would change by +4, and COFIG group C's x dimension value would change by +10, resulting in a total change in Trackable A's x dimension of +14.

Robustness

In order to mitigate the damage from erroneous data, such as data generated from malfunctioning sensors, software bugs, and user hacking; there is a minimal allowed uncertainty. Filters can exist in LockAR implementations, to catch this type of data generating behavior, such as computational intelligence classifiers and smoothing functions (i.e., Kalman filters and higher order Markov chains). This cannot be relied on to catch all such behavior, and is computationally intensive, so minimum uncertainty parameters for measurements are a reliable, computationally undemanding, secondary measure to improve robustness.

GPS Relaxation

In addition to the relative positions between Trackables given by their COFIG coordinates, each Trackable also has a GPS/global coordinate associated with it at creation, as well as an uncertainty associated with this estimated GPS (EGPS) coordinate. This means that whenever a Trackable is viewed, its EGPS coordinate relaxes a little, reducing its uncertainty, based on the EGPS coordinate that the viewing device gives it. A Trackable's EGPS coordinate can also relax based on the distance to another Trackable and that Trackable's EGPS coordinates, as measured by a device. This allows for the accuracy of the EGPS position of the Trackable to increase over time, while the COFIG system separately increases the accuracy of the relative positions of Trackables.

Tethering

Virtual objects, such as augmented reality content, can be placed and positioned in the real world by associating or "tethering" them to one or more Trackables. Untethered AR content can also benefit from the LockAR system by using the increased accuracy with which a device can globally position itself. This helps both in placing AR content accurately, as well as in viewing AR content in the right place. Tethering AR content allows the accuracy of its global position to increase over time, as well as the accuracy of COFIG coordinates. In some examples, AR content may be tethered by a user selecting a Trackable, and positioning the AR content relative to it. This tethers the AR content to that specific Trackable, at a specific distance and orientation. As the EGPS and COFIG positions of the Trackable relax, so do the EGPS and COFIG positions of the AR content tethered to it, as the AR content always maintains the same orientation and distance from the Trackable in both EGPS and COFIG space. The uncertainty in the AR content's position in EGPS or COFIG space is derived from combining the uncertainty of the position of the Trackable it is tethered to, to the device's uncertainty in the relative position of that Trackable at the time of content placement. The creation of a tether can happen automatically. For example, if a user creates a piece of AR content and positions it in the world, the device could automatically generate a Trackable from the surrounding environment and tether the AR content to it. Alternatively, the device could look at its current best estimates of positions of nearby Trackables, and automatically choose one of them to be the tethering Trackable, based on various attributes such as, the device's current uncertainty in the Trackable's position, the robustness of that Trackable, and that Trackable's stored uncertainty in its own COFIG position.

It is also possible to tether AR content to multiple Trackables. This has the benefit of increased robustness, so that if there is a problem with any one of the individual Trackables, such as their removal or change, the position of the AR content will still be able to improve and ignore COFIG drift. COFIG drift is when points in a COFIG group become less accurate relative to GPS and to their previous COFIG coordinates, as they become more accurate relative to each other. This can be an issue if a Trackable becomes inactive, as its COFIG coordinates will not change, nor will the calculated COFIG coordinates of AR content tethered to it. This can result in the AR content being displayed incorrectly relative to the real world, because the device's estimate of its position and orientation in COFIG space is incorrect. When AR content is tethered to multiple Trackables, either during creation or editing, it gains estimated position and orientation information about the relationships between itself and the Trackables it is tethered to. This information is based on the device's best guess of the positions of those Trackables, which in turn is based on sensor data, as well as their COFIG positions. This estimated position and orientation information changes if it is manually edited by a user with the relevant permissions or if the Trackable object itself is known by the system to have changed position and orientation in physical space (e.g., if a marker has been moved and the marker was being used as a Trackable). When the AR content calculates its position in COFIG or global coordinate space, it does so by calculating its estimated position according to each Trackable it is tethered to, and then combining those to get its final estimated position. The estimated positions can be combined in many ways, such as by averaging them, averaging them weighted by their inverse uncertainty, and by merging their Gaussian distributions using an update technique. The process of combining Gaussian distributions begins with an arbitrary estimate as the prior probability, which is then updated using one of the other estimated positions, and the resulting distribution is then updated by combining arbitrary estimated positions with it, until all estimated positions outside of the starting distribution have been used to update. Tethering to multiple Trackables can also occur automatically by algorithmically choosing the Trackables according to the criteria as described above, or manually, by having a user explicitly select or create multiple Trackables.

LockAR Areas

One use of LockAR is to position AR content for creation and viewing against the backdrop of the real world, or a virtual representation of the real world. The following section is written with regards to AR content, but applies to Trackables as well. As a user moves through the world with a LockAR enabled AR application, the application queries the server and GPS at regular intervals, such as once per minute, as well as querying if the dead reckoning or pedestrian dead reckoning (PDR) from the device's internal motion sensors indicates that the device has moved farther than a set distance from the location where the device last queried the server or GPS. The periods of time and distance for querying the server and the GPS can vary and be tracked independently. It is also possible that they can be manually or algorithmically altered. In addition, the server can send push notifications to the device if new AR content appears within its range. Whenever the server is queried, it checks to see if the device's "meta-data area" intersects with the "meta-data area" of any AR content.

When a device's meta-data area intersects with the meta-data area of a piece of AR content, the device downloads the meta-data for that AR content. This meta-data consists of the content's estimated position, as well as its various associated areas (in order: meta-data, caching, viewing, and error) and other meta-data. In one implementation the meta-data area must contain at a minimum, all points that comprise the "caching area" of that device or AR content. When the caching areas of the device and AR content intersect, the device downloads all the AR content data that has not be downloaded yet, as well as the data which enables the mobile device to identify and position itself in space relative to the Trackable. The devices downloads updates to this data if the data changes. A large caching area can allow AR content or Trackables to be used in areas where there is no network access available to the device, or used consistently in areas where network access is spotty. In one implementation the caching area must contain at a minimum, all points that comprise the "viewing area" of that device or AR content. When the viewing areas of the device and AR content intersect, the device begins to display the AR content (or actively seek out the Trackable). In one implementation the viewing area must contain at a minimum, all points that comprise the "error area" of that device or AR content. In some implementations the metadata area will not need to contain all points in the caching area, the caching area will not need to include all the points in the viewing area, and or the viewing area will not need to include all of the points of the error area.

The error area is a sphere (or ellipsoid) with a radius (or semi-axes) calculated from the uncertainty in position of the device or AR content. This calculation is done by setting a level of confidence in the position of the device or AR content, which is expressed as a percentage, such as a 99% certainty, that the mobile device is within this distance of its estimated position. Using this desired level of confidence, together with the uncertainty value, it is trivial to calculate the radius (or semi-axes) of the error area. The length of the error radius (or semi-axis) is equal to the length of the radius of a sphere centered on the estimated position, that it is certain the device is within, to a set confidence percentage. For example, if a mobile device has its confidence level set to 99%, with an uncertainty (represented as a standard deviation) in its GPS position of 10 meters, then the radius of the error area will be 25.76 meters. Metadata, caching, and viewing areas are defined areas of arbitrary shape and size surrounding a mobile device or an instance of AR content. The device uses global coordinates, as well as COFIG coordinates if possible. If the device's area intersects with the AR content's area in either global or COFIG space, the area's effects are triggered. There is no explicit event which occurs when the device's error area intersects with the AR content's error area.

Implementations of this technology do not need to define all the areas explicitly. A device explicitly defining "subset" of the areas functions identically to a device explicitly defining all the areas, but implicitly defines the explicitly undefined areas to be their minimum allowed size. For instance, if a Trackable and a device only use error areas, when the Trackable's error area intersects with the device's error area, all the events (meta-data download, cache download, and viewing) will occur. These areas can be manually or algorithmically created, and can be dynamic or static, though they always use the device's, Trackable's, or AR content's coordinates as their origin point. For instance, one implementation could be having areas be spheres, defined by a distance, with the radius of each area being the radius of its minimum allowed size, plus the distance that defines it. This implementation has very fast intersection checking.

Mobile Position Orientation Points (MPOPs)

MPOPs make mobile LockAR possible. With MPOPs, moving Trackables can be positioned in global space, as well as in COFIG space, allowing them work with the rest of LockAR. MPOPs share many similarities to COFIG groups, but there are three key differences. Firstly, MPOPs cannot be contained within COFIG groups. Secondly, MPOPs are intentionally created; and all of the Trackables that exist inside them have been intentionally designated to be there. MPOP coordinates can be manually assigned to Trackables, or automatically generated by taking the estimated global coordinates of the Trackable, and using the inverse of the MPOPs current conversion factor, converting the global coordinates to MPOP coordinates. Even after creation, the MPOP coordinates of Trackables can improve, by using their estimated global coordinates as they're tracked, as well as the MPOP coordinates of other Trackables when a measurement is taken between them, similar to the how EGPS is improved. All of the COFIG groups that are created based on those Trackables are automatically added to the MPOP as well. These COFIG groups cannot contain Trackables that are outside of the MPOP. Thirdly, MPOPs have a dynamic conversion factor between their coordinates and orientations and one or more global coordinate systems (such as GPS). This dynamic conversion factor is based on a set conversion factor between the MPOP coordinates and orientations and one or more global coordinate sources, such as GPS enabled smart phones or ship navigational systems like GNSS and LORAN. Essentially, the Trackables within MPOPs have their GPS coordinates assigned to them by the MPOP, as the MPOP knows where they are in relation to a GPS located beacon. This allows even mobile Trackables to be given GPS coordinates, and to know which other Trackables they can build COFIG groups with. There can be a layer of processing between the global coordinate sources and the MPOP coordinate space, where the direction of the object can be extracted by taking the derivative of the position, as well as applying smoothing and predictive processing (by use of Kalman filters, etc.), in order to more accurately estimate the position of the MPOP. However, even after this processing, there is still uncertainty in the MPOP's global coordinates. When the MPOP assigns global coordinates to a Trackable, those global coordinates have an uncertainty equal to, the MPOP's uncertainty plus the Trackable's uncertainty in its position in MPOP coordinates.

LockAR's core utility lies in using COFIG groups and uncertainty values to create an increasing web of accurately positioned Trackables, in its rules governing the evolution of the COFIG hierarchy, and its uncertainty updates techniques. The web can reach a global size, and its uses are many and varied. The most obvious use, which is discussed in the document above, is in augmented reality to correctly position AR content and users. Other examples of how it could be used include: to produce a geographical representation of an area (when used in concert with other technologies), to create an enhanced GPS system, or as mapping and navigational assistance for robots. The basic functionality could also be extended to map arbitrary n-dimensional data-sets, which opens up the potential for use in data-mining applications as well as machine learning and reinforcement learning possibilities. In addition to this core utility, LockAR has additional features to incorporate moving objects, raise robustness, and improve even more on the AR use case.

Binary Tree COFIG Hierarchy

Binary Tree COFIG Hierarchy is an embodiment where all COFIG groups have exactly two elements. In this embodiment, a COFIG group has either two COFIG groups inside it, one COFIG group and one Trackable, or two Trackables. The "Two elements per COFIG group" property is conserved by the specific Point Inclusion Rules and COFIG Merging Rules of this embodiment.

The Point Inclusion Rules for this embodiment are as above, except follows. When a measurement is made between two Trackables (A and B), and only one is contained within a COFIG group (B in C), then one of two things happens.

If the uncertainty is lower for the new measurement than the uncertainty between the two points in C, then Trackable B is replaced in the hierarchy by a COFIG group (D) which contains Trackables A and B. All of B's uncertainty is contained within D's uncertainty within COFIG group C. A and B share the uncertainty of the measurement between A and B equally within COFIG group D.

If the uncertainty is higher for the new measurement than the uncertainty between the two points in C, then, if C is an apex cofig group, a new COFIG group, E, is created, which encompasses both A and C, with the uncertainty of position of A and C each being half the uncertainty in the measurement between A and B. If C is not an apex COFIG group, then the ancestors of C are searched recursively upwards until the two component elements of one have a larger uncertainty between them, than the A-B measurement. Then, a new COFIG group is inserted in the place of B's ancestor element, this COFIG group consisting of A and the COFIG group it replaced, as elements, with the new COFIG group having the same uncertainty as the old COFIG group, and the old COFIG group, and A, having half the positional uncertainty of A.

Under certain conditions, the binary COFIG tree "rebalances", moving, creating, and destroying COFIG groups, and moving Trackables, to better fit some criteria. For instance, some criteria may be balancing according to the estimated physical distance between Trackables, the uncertainty in the distance between Trackables, the variance in the depth of Trackables, and the maximum depth of Trackables. Some of these criteria, and how they might be implemented, are explained in the following paragraphs.

If re-balancing criteria was the uncertainty in the distance between Trackables, then one rule would be, whenever a Measurement was made between Trackables (A and B), after updating the COFIG groups, and the COFIG coordinates of the Trackables, the system would check the uncertainty in the distance between A and B, and if that uncertainty was lower than the uncertainty between A and the other (recursive) child in its Parent COFIG group, and the uncertainty in the distance between A and B was lower than the uncertainty between B and the other (recursive) child in its Parent COFIG group, then the tree would be rebalanced to place A and B together in the same COFIG group. First, it is determined if A or B had higher uncertainty between them and the other (recursive) child in their Parent COFIG group. Then the Trackable with lower uncertainty is replaced by a COFIG group, which contains both A and B, with the uncertainty between them shared equally by their COFIG coordinates within this new COFIG group. The other child in the group with the Trackable with higher uncertainty is moved up a level replacing its parent COFIG group C, adding its uncertainty in position and position to C's uncertainty in position and position. Re-balancing for distance works similarly.

Re-balancing to keep the maximum depth of Trackables below a certain number, which is a function of the total number of Trackables in the system, works as follows. The re-balancing system activates when two Trackables exceed the maximum allowed depth. First, the system searches up the chain of ancestors until a node is reached which has a sibling node with a number of Trackable descendants less than 2^(maximum depth−COFIG group depth). Then, into this COFIG group, as many descendant Trackables of the node as possible are put. This placement starts with the highest descendant Trackables, or Trackable pairs. These are then moved into the free space of the sibling COFIG Group, and then the COFIG groups and Trackables below them are moved into their now vacant position using a recursive algorithm to minimize information loss. This is repeated until all Trackables are within the appropriate depth limit.

When two COFIG groups merge, a similar process to point inclusion occurs. When a Measurement is made between two Trackables, A and B, which are within two different top-level COFIG groups, first, the uncertainty of the Top level of each COFIG Group (C and D) relative to B and A are calculated. This is done by taking the Measurement between A and B, and continually transforming the coordinates into the Grandparent COFIG space, until the Top level COFIG coordinate space has been reached. Then the COFIG group that has the lowest uncertainty is placed into the COFIG hierarchy with the higher uncertainty as though it were a point that needed inclusion. If a Tree needs to be as flat as possible, then the Maximum depth would be set to log base 2 of the number of Trackables, rounded up.

These re-balancing techniques can be executed on any COFIG group, not just a top level COFIG group. Then, in order to have dynamic re-balancing, an algorithm simply has to locate COFIG groups, which are unbalanced, and re-balance them to within acceptable parameters. For instance, an algorithm could check to make sure no child of a COFIG group was four times longer than the other child. It would check COFIG groups for consistency with this rule either periodically, or when certain events occurred. Then it would re-balance with a maximum depth of three times the current depth of the shallowest child.

Alternative Update Mechanisms

An nth-order Markov chain may be used, in combination with the update mechanism described above to detect when an object was moved. In some examples, Bayesian inference or Jeffery conditioning may be used instead of Bayesian analysis. A number of previously measured distributions may be saved, and added together to create the posterior distribution. The newer distributions may be given more weight, e.g., with a half-life mechanism making the older distributions asymptotically or exponentially go to zero. The weighting can also be done according to the inverse of the uncertainty of the measurements. A generalized ad hoc decrease in certainty may be added to the posterior distribution, proportional to the likelihood of the new data.

COFIG Graph

COFIG Graph refers to the concept of overlapping COFIG groups, so that COFIG groups form a graph, rather than a tree. The graph is pruned whenever a length-one path between two Trackables has a higher uncertainty on update than a path with length of two or more. The pruned edge is the length-one path. If a measurement is made between two nodes without a length-one path in the graph (e.g., resulting in a stored positional relationship between the two nodes), we first assume that there is a length-one path between the two nodes. This assumed length-one path is the composite of all the lengths in the shortest (least uncertain) path between the two nodes. This composite edge may then be updated with the new measurement. If the updated composite edge has higher uncertainty than the non-updated composite edge, then no new edges are added to the graph due to the measurement that was made. However, if the updated composite edge has lower uncertainty than the non-updated composite edge, then the updated composite edge may be inserted into the graph as the edge between the two nodes where the measurement was made.

Illustrative Computing System

Figure 23:
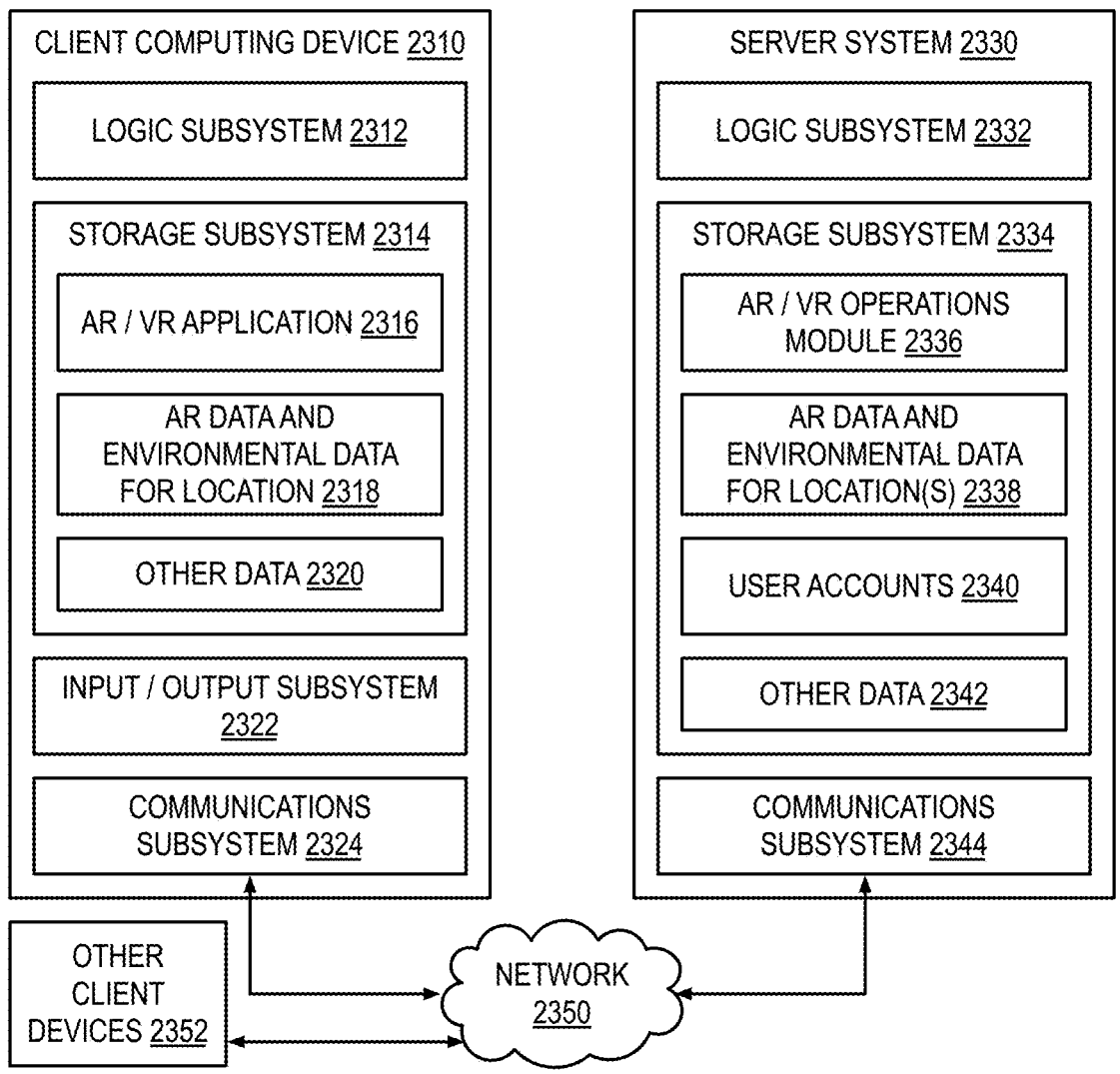
FIG. 23 is a schematic diagram depicting an illustrative computing system.

FIG. 23 depicts an example computing system 2300. Computing system 2300 is a non-limiting example of a computing system that may implement the methods, processes, and techniques described herein. Computing system 2300 includes a client device 2310. Client device 2310 is a non-limiting example of an onsite computing device and an offsite computing device. Computing system 2300 further includes a server system 2330. Server system 2330 includes one or more server devices that may be co-located or distributed. Server system 2330 is a non-limiting example of the various servers described herein. Computing system 2300 may include other client devices 2352, which may include onsite and/or offsite device with which client device 2310 may interact.

Client device 2310 includes a logic subsystem 2312, a storage subsystem 2314, an input/output subsystem 2322, and a communications subsystem 2324, among other components. Logic subsystem 2312 may include one or more processor devices and/or logic machines that execute instructions to perform task or operations, such as the methods, processes, and techniques described herein. When logic subsystem 2312 executes instructions, such as a program or other instruction set, the logic subsystem is configured to perform the methods, processes, and techniques defined by the instructions.

Storage subsystem 2314 may include one or more data storage devices, including semiconductor memory devices, optical memory devices, and/or magnetic memory devices. Storage subsystem 2314 may hold data in non-transitory form where it may be retrieved from or written to by logic subsystem 2312. Examples of data held by storage subsystem 2314 include executable instructions, such as an AR or VR application 2316, AR data and environmental data 2318 within the vicinity of a particular location, and other suitable data 2320. AR or VR application 2316 is a non-limiting example of instructions that are executable by logic subsystem 2312 to implement the client-side methods, processes, and techniques described herein. At least some of the data stored in storage system may be stored in a database system of one or more databases.

Input/output subsystem 2322 includes one or more input devices such as a touch-screen, keyboard, button, mouse, microphone, camera, other on-board sensors, etc. Input/output subsystem 2322 includes one or more output devices, such as a touch-screen or other graphical display device, audio speakers, haptic feedback device, etc. Communications subsystem 2324 includes one or more communications interfaces, including wired and wireless communications interfaces for sending and/or receiving communications to or from other devices over a network 2350. Communications subsystem 2324 may further include a GPS receiver or other communications interfaces for receiving geo-location signals.

Server system 2330 also includes a logic subsystem 2332, storage subsystem 2334, and a communications subsystem 2344. Data stored on storage subsystem 2334 of the server system includes an AR/VR operations module that implements or otherwise performs the server-side methods, processes, and techniques described herein. Module 2336 may take the form of instructions, such as software and/or firmware that are executable by logic subsystem 2332. Module 2336 may include one or more sub-modules or engines for implementing specific aspects of the disclosed subject matter. Module 2336 and a client-side application (e.g., application 2316 of client device 2310) may communicate with each other using any suitable communications protocol, including application program interface (API) messaging. Module 2336 may be referred to as a service hosted by the server system from the perspective of client devices. Storage subsystem may further include data such as AR data and environmental data for many locations 2338. Data 2338 may include one or more persistent virtual and/or augmented reality models that persist over multiple sessions. Previously described data 2318 at client computing device 2310 may be a subset of data 2338. Storage subsystem 2334 may also have data in the form of user accounts 2340 for user login, enabling user state to persist over multiple sessions. Storage subsystem 2334 may store other suitable data 2342. At least some of the data stored in storage system may be stored in a database system of one or more databases.

As a non-limiting example, server system 2330 hosts, at module 2336, an augmented reality (AR) service configured to: send environmental and AR data to an onsite device over a communications network that enables the onsite device to present an augmented reality AR representation, at a graphical display of the onsite device, that includes an AR content item incorporated into a live view of a real-world environment to provide an appearance of the AR content item being present at a position and an orientation relative to a trackable feature within the real-world environment; send environmental and AR data to an offsite device over the communications network that enables the offsite device to present a virtual reality (VR) representation of the real-world environment, at a graphical display of the offsite device, that includes the AR content item incorporated as a VR content item into the VR representation to provide an appearance of the VR content item being present at the position and the orientation relative to a virtual representation of the trackable feature within the VR representation; receive update data over the communications network from an initiating device of the onsite device or the offsite device that initiated a change with respect to the AR content item, the update data defining the change with respect to the AR content item; and send the update data over the communications network from the server system to a recipient device of the other of the onsite device or the offsite device that did not initiate the change, the update data interpretable by the recipient device to update the AR representation or the VR representation to reflect the change.

Illustrative Data Structure

Figure 24:
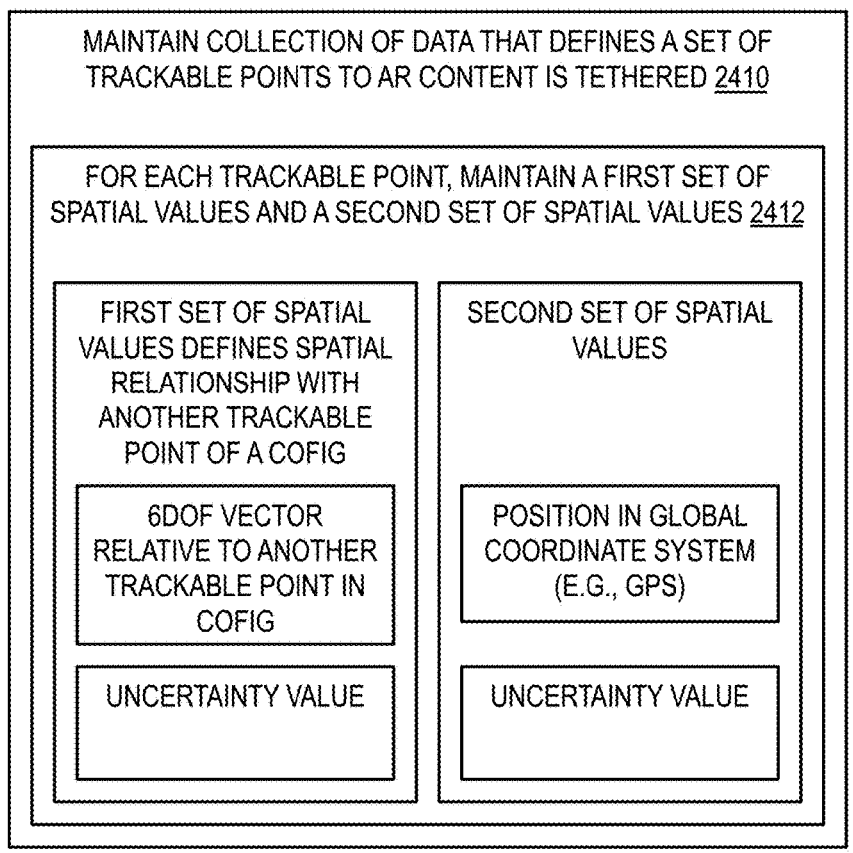
FIG. 24 is a schematic diagram depicting aspects of an illustrative data structure.

FIG. 24 is a flow diagram depicting an example data structure suitable for use with the present disclosure, and a method of implementing the data structure. The method of FIG. 24 may be performed or otherwise implemented by a computing device or a computing system of one or more computing devices.

At 2410, the method includes maintaining a collection of data in a database system that defines a set of trackable points in which each trackable point is associated with an augmented reality content item. At 2412, for each trackable point defined by the collection of data, the method includes maintaining a first set of spatial values and a second set of spatial values in the database system for that trackable point. The first set of spatial values may be based on measurements obtained from a first set of one or more sensor types of an onsite device or a plurality of onsite devices. As an example, the first set of spatial values may refer to a vector between Trackables of a COFIG group in which the measurements obtained from the first set of one or more sensor types include the sensor fusion techniques described herein, for example, with respect to FIGS. 9 and 10B. For example, the first set of spatial values may represent a spatial difference between that trackable point and another trackable point forming a group, such as a COFIG group. Here, the first set of spatial values represents a relative distance of paired points from each other. While examples are provided for the first set of spatial values with respect to a spatial difference between two trackable points of a group, this group or another group may include three or more trackable points in which each trackable point of the group has a corresponding set of spatial values that represents a distance relative to at least one other trackable point of the group. The second set of spatial values may be based on measurements obtained from a second set of one or more sensor types of the onsite device. As an example, the second set of spatial values may represent a spatial difference between the trackable point and a common reference within a shared coordinate system (e.g., a global coordinate system) with other trackable points. In this example, the measurements obtained from the second set of sensor types may include GPS measurements of position within a global GPS coordinate system. The first set and the second set of sensor types may differ from each other by at least one sensor type. For example, sensor fusion used for the first set of sensor types differs from GPS without sensor fusion by way of one or more sensor types. In some examples, the first and second sets of sensor types may share one or more sensor types. For example, GPS may be used as part of some sensor fusion techniques and may be separately used as a standalone measurement and sensor type. Because one or more sensor types differ between the first and second set of sensor types, the measurements obtained via each set of sensor types have different inherent measurement uncertainties.

For each trackable point defined by the collection of data, the method further includes maintaining one or more uncertainty values for each set of spatial values. For example, the first set of spatial values described above may include six spatial values defining a relative distance between two trackable points as a 6 degree-of-freedom (6DOF) vector. This vector may additionally be associated with an uncertainty that represents the uncertainty with respect to the relative distance measured between the trackable points as currently identified by the first set of spatial values. As described herein, the uncertainty value may be reduced over time as more measurements of the relative distance between the trackable points are obtained. The second set of spatial values also has an associated uncertainty value.

Illustrative Methods

Figure 25:
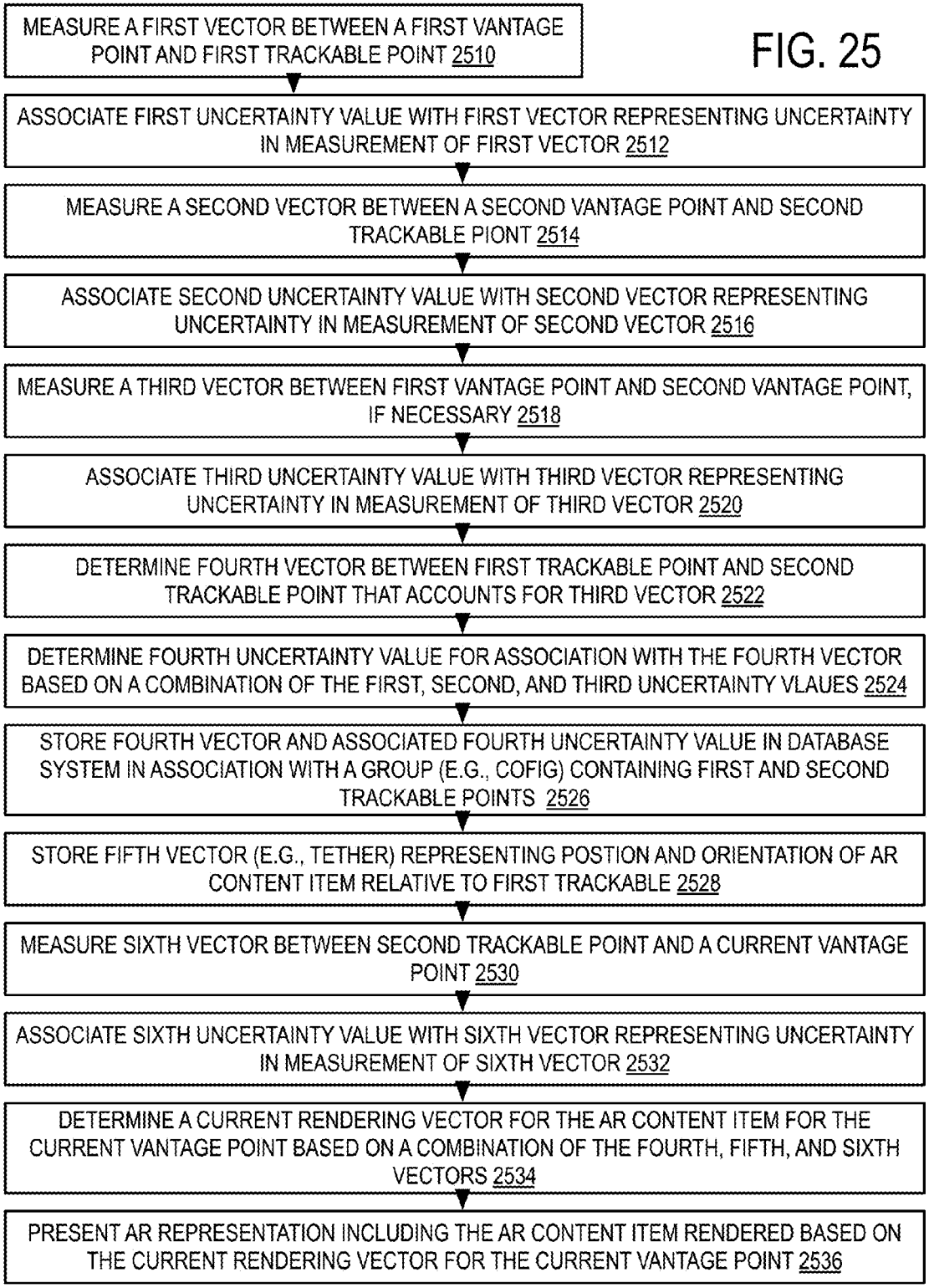
FIG. 25 is a flow diagram depicting an illustrative method of determining a COFIG vector and a rendering vector for AR content based on measurements obtained by an onsite mobile device.
Figure 26:
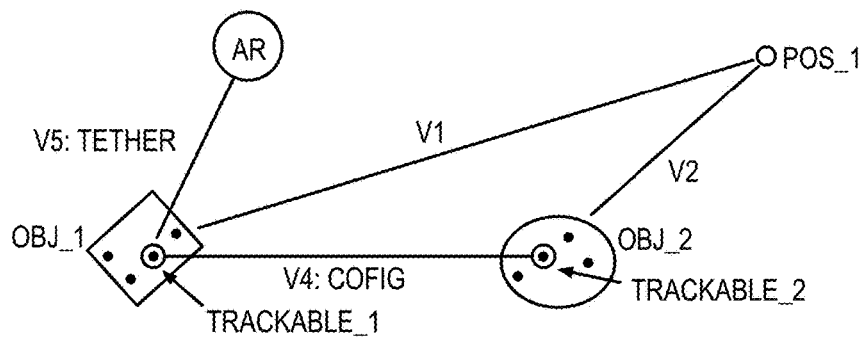
FIGS. 26 and 27 depict an illustrative process by which an onsite mobile device obtains measurements.
Figure 27:
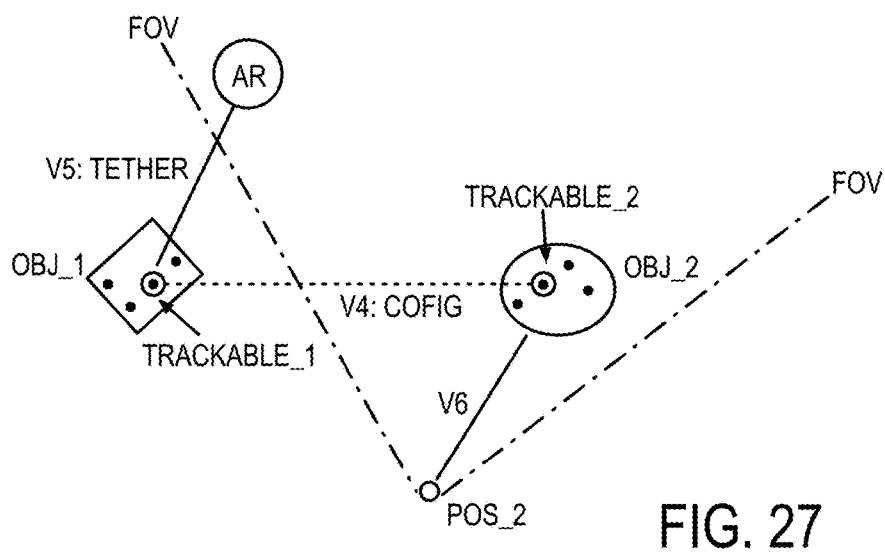

FIG. 25 is another flow diagram depicting an example method. The method of FIG. 25 may be performed or otherwise implemented by a computing device or a computing system of one or more computing devices. As a non-limiting example, aspects of the method may be performed by a server system, or by a server system and an onsite client device, or by an onsite client device, or by two or more onsite devices in combination with a server system. FIGS. 26 and 27 depict a non-limiting example of an implementation of the method of FIG. 25.

In FIGS. 25-27, vectors were measured by an onsite device that represent a distance between a perspective (e.g., position and orientation) of the onsite device and a trackable reference point (i.e., trackable point) of a trackable object that has its own position and orientation. Uncertainty values associated with vector measurements are associated with the vectors, for example, in a database system.

At 2510, the method includes measuring a first vector between a first vantage point and a first trackable reference point. For example, in FIG. 26, an onsite device has a perspective indicated at POS_1. The onsite device obtains measurements of its distance (V1) relative to a first trackable point (TRACKABLE_1) of a first trackable object (OBJ_1). At 2512, the method includes determining and associating a first uncertainty value with the first vector that represents an uncertainty in measurement of the first vector.

At 2514, the method includes measuring a second vector between a second vantage point (POS_2) and a second trackable reference point. The onsite device also obtains measurements of its distance (V2) relative to and a second trackable point (TRACKABLE_2) of a second trackable object (OBJ_2). At 2516, the method includes determining and associating a second uncertainty value with the second vector that represents an uncertainty in measurement of the second vector. Both V1 and V2 have uncertainty values (U1, U2) associated with each measurement of V1 and V2 in FIGS. 26 and 27. Example measurements for V1 and V2 are depicted in FIG. 26 as respective six degree-of-freedom (6DOF) vectors that include displacement in three dimensions and orientation in yaw, roll, and pitch dimensions.

In this example, the onsite device has the same perspective or vantage point when measuring V1 and V2. In other examples, the onsite device may change vantage points between measuring V1 and V2. If the vantage point changes, the method further includes, at 2518, measuring a third vector between the first vantage point and the second vantage point. At 2520, the method includes determining and associating a third uncertainty value with the third vector that represents an uncertainty in measurement of the third vector. These operations may be omitted if the vantage point remains constant or changes less than a threshold amount or level between measuring vectors V1 and V2. As an example, vectors V1 and V2 may be measured at the same time using the same measurement techniques from the same perspective. In other examples, the onsite device may move between measurements of V1 and V2.

At 2522, the method includes determining a fourth vector between the first trackable reference point and the second trackable reference point based on a difference between the first vector and the second vector that additionally accounts for the third vector (if present), representing a difference between the first and the second vantage points in vector space. As previously described, if the vantage point remains constant, then the third vector may be null or omitted. If the first and second vantage points differ, then the third vector may be combined with the first and the second vector to determine the fourth vector. At 2524, the method includes determining and associating a fourth uncertainty value with the fourth vector that represents a combination of the uncertainties in measurement of the first, second, and third vectors.

At 2526, the method includes storing the fourth vector and fourth uncertainty value in a database system in association with a group (e.g., COFIG) containing the first trackable reference point and the second trackable reference point. An example of the fourth vector (V4) is depicted in FIGS. 26 and 27 as the value representing the distance and uncertainty between two trackable points of a COFIG group. In some examples, the database system may reside locally at the onsite device and/or may reside at a remote server system.

At 2528, the method includes storing, in the database system, a fifth vector (V5) representing a position and an orientation of an (AR) content item relative to the first trackable reference point. This fifth vector is an example of a tether for the AR content item depicted in FIG. 27. As an example, the fifth vector may be defined by the original and current placement of the AR content item relative to the first trackable point. For example, the fifth vector in this example may be user-defined and as a tether to a single Trackable, may be absolute with no uncertainty.

At 2530, the method includes measuring a sixth vector between the second trackable reference point and a current vantage point of the onsite device (or a different onsite device that communicates with a server system). For example, FIG. 27 depicts the onsite device at a current vantage point (POS_2) that differs from the previous vantage point (POS_1). It will be understood that the onsite device depicted in FIG. 26 and the onsite device depicted in FIG. 27 may represent two different onsite devices that measure relative distances and uncertainties at different times relative to each other. At 2532, the method includes determining and associating a sixth uncertainty value with the sixth vector that represents an uncertainty in measurement of the sixth vector.

At 2534, the method includes determining a current rendering vector for the AR content item (i.e., "AR" in FIGS. 26 and 27) for a current vantage point of the computing device (i.e., POS_2). In this example, FIG. 27 depicts an example field of a current view (FOV) for a live view of the onsite device with which AR content may be integrated to provide an AR representation. In FIG. 27, the first trackable object is located outside of the FOV, but the second trackable object of the COFIG is located within the FOV. As such, a distance to the second trackable point can be measured by the onsite device. The current rendering vector of the AR content item (i.e., "AR" in FIGS. 26 and 27) is determined as a combination of the fourth vector, the fifth vector, and the sixth vector. Hence, in this example, the COFIG group enabled the onsite device to accurately determine the rendering vector for AR content even though the trackable object to which the AR content item was tethered was not currently within the FOV of the onsite device. In some examples, the fourth vector representing the measurement of the COFIG may be retrieved from the database system or otherwise request from a server system, such as where a different onsite device from the onsite device that measured vectors V1, V2, or V3 determines a current rendering vector.

At 2536, the method includes, at a computing device (e.g., the onsite device located at POS_2), presenting an AR representation via a graphical display. In this example, the AR representation includes the AR content item (i.e., "AR" FIGS. 26 and 27) rendered based on the current rendering vector within a live view of a real-world environment for the current vantage point of the computing device.

Figure 28:
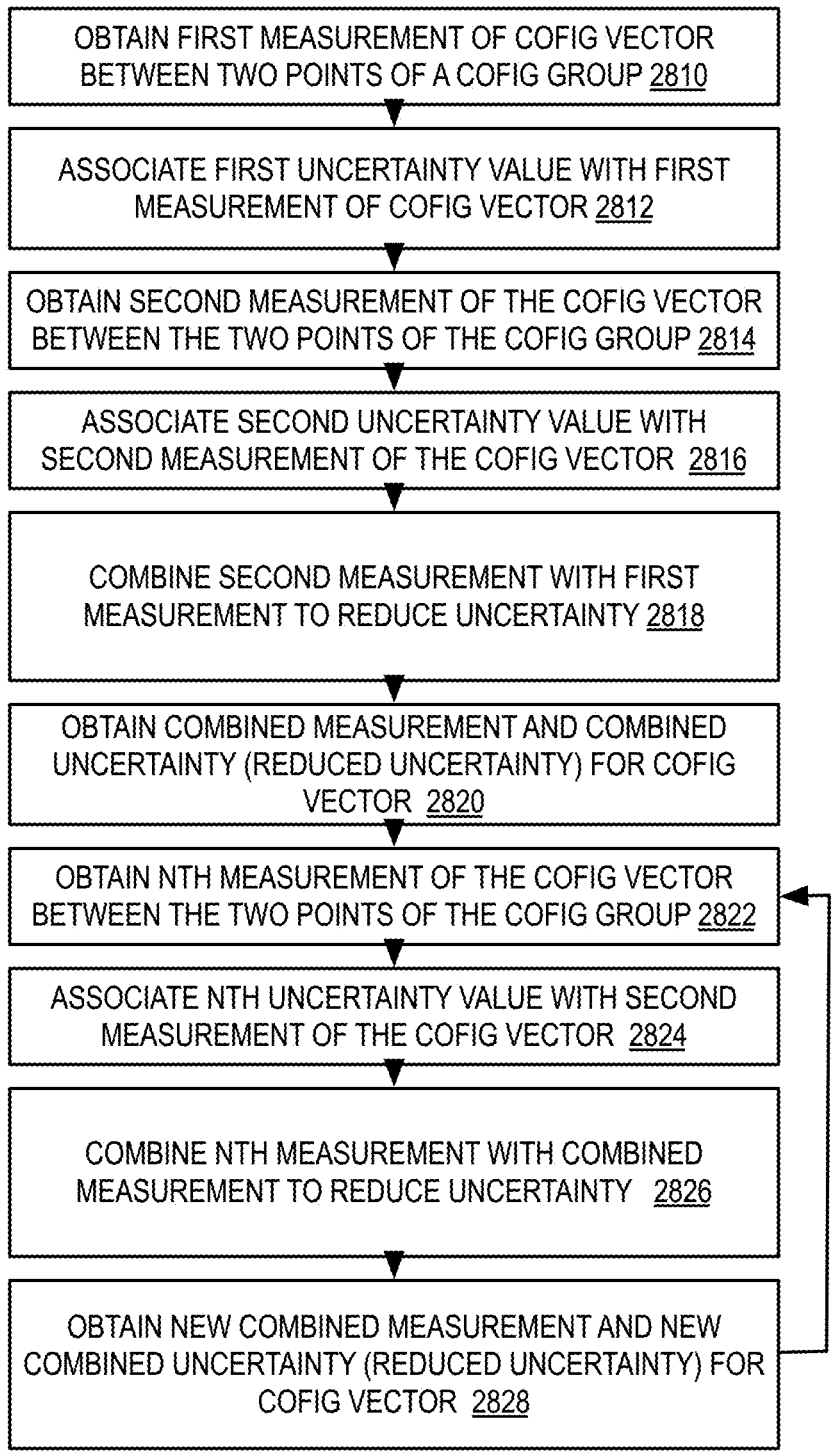
FIG. 28 is a flow diagram depicting an illustrative method of reducing uncertainty in a COFIG vector.

FIG. 28 is another flow diagram depicting an example method. The method of FIG. 28 may be performed or otherwise implemented by a computing device or a computing system of one or more computing devices. In the previous flow diagram of FIG. 25, vectors were measured by an onsite device, representing a distance between a perspective (e.g., position and orientation) of the onsite device and a trackable reference point of a trackable object that has its own position and orientation. In FIG. 28, multiple onsite devices measure a trackable point from different perspectives and/or use different sensors to obtain the measurement and/or use different measurement techniques such that each measurement has a different level of uncertainty. Measurements are combined with the previous measurements to reduce the overall uncertainty of the aggregate measurement.

At 2810, a first measurement is obtained of a COFIG vector (e.g., the fourth vector—V4 in FIG. 24) between two trackable points of a COFIG group. An example process for measuring a COFIG vector was previously described with reference to FIGS. 24-26. At 2812, a first uncertainty value is associated with the first measurement. At 2814, a second measurement is obtained of the COFIG vector between the two trackable points of the COFIG group. The second measurement may be performed by a different onsite device from a different vantage point or using different sensors or sensor data processing techniques. At 2816, a second uncertainty value is associated with the second measurement. At 2818, the second measurement is combined with the first measurement (e.g., by averaging or some other filtered combination based on relative uncertainty values). At 2820, a combined measurement and a combined uncertainty value are obtained that has a reduced overall uncertainty for the COFIG vector. At 2822, 2824, 2826, 2828, the process is repeated for the Nth measurement of the COFIG vector to obtain a new combined measurement and a new combined uncertainty for the COFIG vector at 2828.

Illustrative Method for Establishing COFIG Relationships

FIGS. 29-32 depict an illustrative method for establishing relationships between two COFIGs. Aspects of LockAR described above may be utilized in the method steps described below. Where appropriate, reference may be made to components and systems that may be used in carrying out each step. These references are for illustration, and are not intended to limit the possible ways of carrying out any particular step of the method. FIGS. 29-32 depict steps performed in an illustrative method, and may not recite the complete process or all steps of the method. Although various steps of the method are described below and depicted in FIGS. 29-32, the steps need not necessarily all be performed, and in some cases may be performed in a different order than the order shown. The diagrams of FIGS. 29-32 are depicted in two dimensions for efficiency of explanation. However, it will be clear to one having ordinary skill in the art that Trackables and COFIGs may exist in three-dimensional space.

FIGS. 29-32 show that Trackables each have COFIG coordinates relative to an origin of their respective COFIG group, as described above. In addition, FIGS. 29-32 depict how a measurement between Trackables in two different COFIGs can be used to create a third COFIG group with its own origin. The origins of those first two COFIG groups can be defined within the third COFIG group, and can be used to translate the positions of Trackables from lower level COFIG groups to higher-level COFIG groups.

As depicted in FIG. 29, two different COFIG groups, a first COFIG 2901 and a second COFIG 2902, each have two Trackables positioned within them: Trackables 2903 and 2904 within COFIG 2901, and Trackables 2905 and 2906 within COFIG 2902. These positions comprise coordinates which place the Trackable relative to an origin point of the respective COFIG group (i.e., origin 2907 of first COFIG 2901 and origin 2908 of second COFIG 2902). In practice, each Trackable also has an individual orientation defined within the COFIG group, and each COFIG may have an orientation of its own. However, for simplicity in explaining this example, all Trackables in COFIG 2901 are assumed to have an orientation of zero degrees relative to the Y axis, all Trackables in COFIG 2902 are assumed to have an orientation of zero degrees relative to the X axis, and COFIGs 2901 and 2902 are assumed to have parallel Y axes, as shown.

Figure 30:
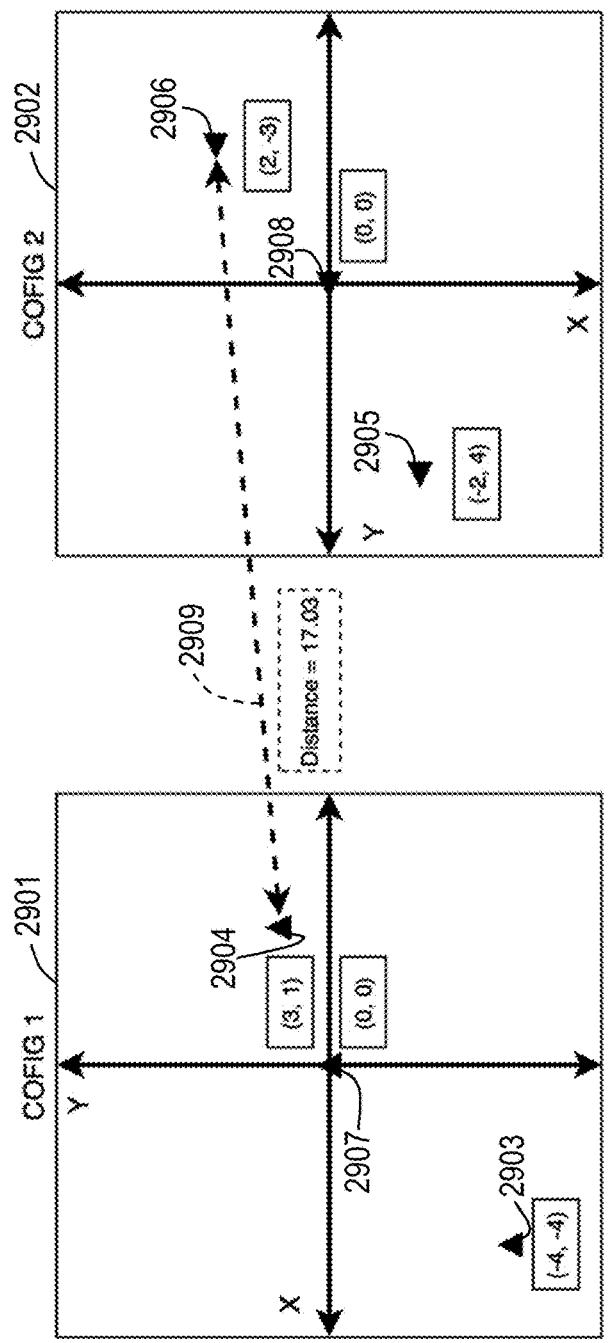
FIG. 30 depicts a second stage of an illustrative method for combining two COFIGs into a parent COFIG and relating Trackables thereof, according to the present teachings.

As indicated in FIG. 30, a measurement 2909 may be made between Trackable 2904 and Trackable 2906, which gives the distance and positions of the two Trackables relative to each other, as well as their relative orientations. Measurement 2909 corresponds to a six-degree-of-freedom vector between the two Trackables. In this case, Trackable 2906 is rotated 90 degrees to the left relative to Trackable 2904. Trackable 2906 has a position in COFIG 2901 of (+17, +1) relative to Trackable 2904, and Trackable 2904 has a position in COFIG 2902 of (−1, +17) relative to Trackable 2906. This measurement may be used to determine positional and orientation offsets between COFIG 2901 and COFIG 2902.

Figure 31:
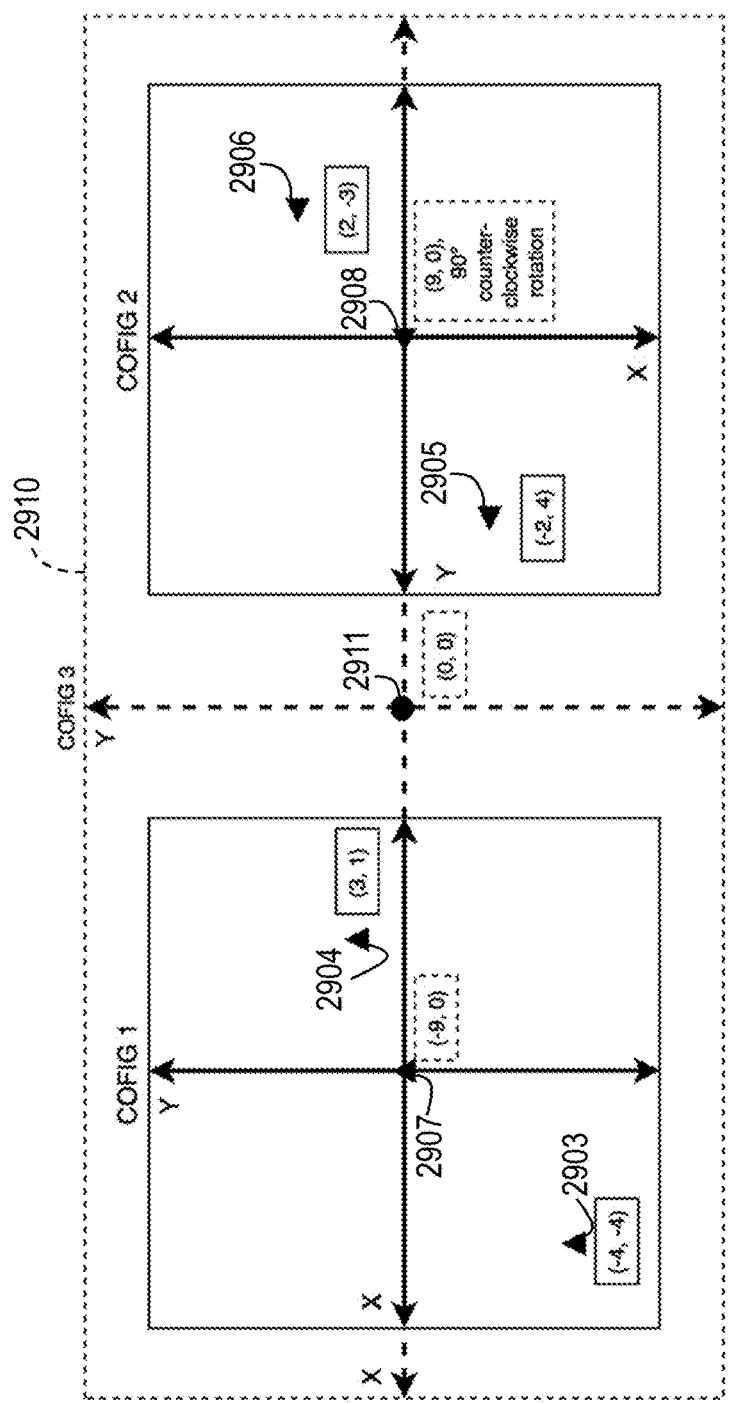
FIG. 31 depicts a third stage of an illustrative method for combining two COFIGs into a parent COFIG and relating Trackables thereof, according to the present teachings.

As indicated in FIG. 31, a third COFIG group, COFIG 2910, is generated. Third COFIG 2910 contains first COFIG 2901 and second COFIG 2902. An origin 2911 and orientation of third COFIG 2910 may be calculated using any suitable method or framework. In this example, origin 2911 is a midpoint between origins 2907 and 2908. The positions and orientations of origins 2907 and 2908 with respect to origin 2911 may be calculated and stored as the respective COFIG's offset within third COFIG 2910. In this example, the orientation of third COFIG 2910 is assumed to be the same as that of first COFIG 2901, again for the sake of simplicity.

Figure 32:
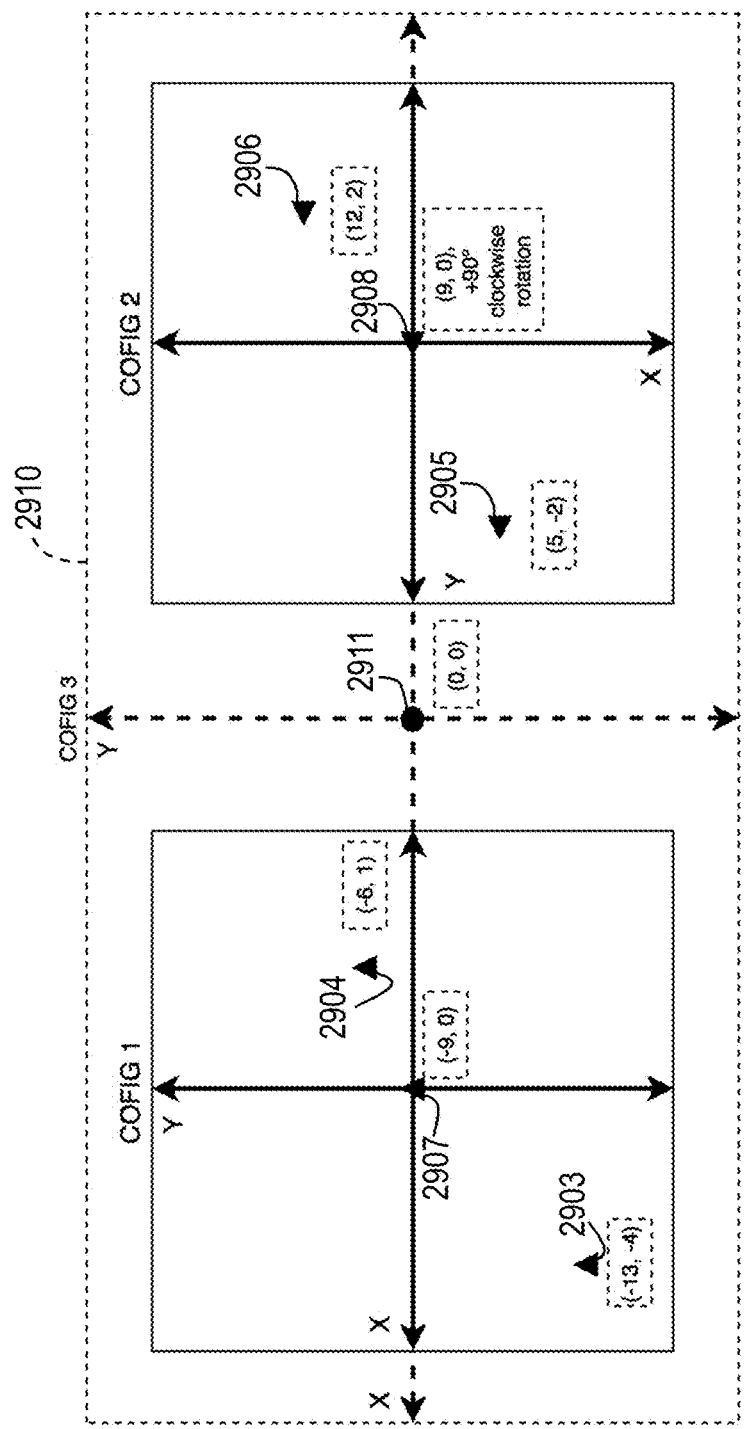
FIG. 32 depicts a fourth stage of an illustrative method for combining two COFIGs into a parent COFIG and relating Trackables thereof, according to the present teachings.

As depicted in FIG. 32, the positions and orientations of all four of the Trackables may be defined within third COFIG 2910. To calculate, for example, the position of Trackable 2904 of first COFIG 2901 with respect to third COFIG 2910, the orientation of Trackable 2904 is rotated within first COFIG 2901 by the rotational offset of COFIG 2901 (which is in this case zero), giving an initial position of (3, 1). The positional offset of COFIG 2901 (in this case, (−9, 0)) may then be added, giving a final position of Trackable 2904 within third COFIG 2910 of (−6, 1).

Additional Examples and Illustrative Combinations

This section describes additional aspects and features of accurate positioning system for augmented reality content, and related methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

In accordance with the preceding disclosure, a computer-implemented method includes measuring a first vector between a first vantage point and a first trackable reference point; measuring a second vector between a second vantage point and a second trackable reference point; measuring a third vector between the first vantage point and the second vantage point; determining an estimate of a fourth vector between the first trackable reference point and the second trackable reference point based on a difference between the first vector and the second vector that additionally accounts for the third vector representing a difference between the first and the second vantage points in vector space; storing the estimate of the fourth vector in a database system in association with a group containing the first trackable reference point and the second trackable reference point; storing, in the database system, a fifth vector representing a position and an orientation of an augmented reality (AR) content item relative to the first trackable reference point; measuring a sixth vector between the second trackable reference point and the current vantage point of the computing device; determining a current rendering vector for the AR content item for a current vantage point of the computing device, the current rendering vector determined as a combination of the fourth vector, the fifth vector, and the sixth vector; and at a computing device, presenting an AR representation via a graphical display, the AR representation including the AR content item rendered based on the current rendering vector within a live view of a real-world environment for the current vantage point of the computing device. The method may further include associating a first uncertainty value with the measurement of first vector in the database system, the first uncertainty value representing uncertainty in the measurement of the first vector; associating a second uncertainty value with the measurement of second vector in the database system, the second uncertainty value representing uncertainty in the measurement of the second vector; associating a third uncertainty value with the measurement of third vector in the database system, the third uncertainty value representing uncertainty in the measurement of the third vector; determining a fourth uncertainty value for the estimate of the fourth vector based on a combination of the first, second, and third uncertainty values; and associating the fourth uncertainty value with the estimate of the fourth vector in the database system. The method may further include combining the estimate of the fourth vector with a plurality of other estimates of the fourth vector obtained from a plurality of onsite mobile devices to obtain a combined estimate of the fourth vector, the combined estimate taking the form of a weighted average of the fourth vector with the plurality of other estimates in which weighting is based on the uncertainty value associated with each estimate. The method may further include associating the first trackable reference point and the second trackable reference point with a first group in the database system responsive to determining the estimate of the fourth vector in which the estimate of the fourth vector represents a first entry of a measurement of the fourth vector within the database system. In an example, the first trackable reference point is a member of a second group of trackable points within the database system, and the second trackable reference point is a member of third group of trackable points within the database system. The method may further include defining a hierarchy between the first group, the second group, and the third group within the database system. In an example, the first group has a different hierarchical level as compared to the second and third group. The method may further include combing an uncertainty value associated with the estimate of the fourth vector with a plurality of uncertainty values associated with other estimates of the fourth vector obtained from a plurality of onsite mobile devices to obtain a reduced combined uncertainty value for a combined estimate of the fourth vector. The method may further include comparing the combined uncertainty value to a threshold; and adjusting a hierarchical relationship among the first group, second group, and third group based on a result of the comparison.

Another computer-implemented method includes obtaining measurement data representing measurements performed by onsite mobile devices with respect to trackable objects within a real-world environment, each measurement having an associated uncertainty value within the measurement data; maintaining a collection of data in a database system that defines a set of trackable points in which each trackable point represents a trackable object to which an augmented reality content item is tethered; and for each trackable point defined by the collection of data, maintaining a first set of spatial values and a second set of spatial values in the database system for that trackable point in which the first set of spatial values represent a first spatial relationship between that trackable point and another trackable point forming a group of two or more trackable points, and the second set of spatial values represent a location of the trackable point in a global coordinate system. The first set of spatial values may be based on measurements obtained from a first set of one or more sensor types of an onsite device, the second set of spatial values may be based on measurements obtained from a second set of one or more sensor types of the onsite device, and the first set and the second set of sensor types may differ from each other by at least one sensor type. The method may further include, for the first set of spatial values for each trackable point, maintaining an uncertainty value that is associated with the measurements obtained from the first set of one or more sensor types. The method may further include reducing the uncertainty value for the first set of spatial values as additional measurements of the spatial difference between the trackable points of the group are obtained from one or more onsite devices. In an example, the group of two or more trackable points includes at least a third trackable point. In an example, the group of two or more trackable points includes one or more subgroups of points. In an example, each set of spatial values includes a three degrees-of-freedom (3DOF) position and/or 3DOF orientation as a combined six degrees-of-freedom 6DOF set of spatial values. The method may further include using the first set of spatial values to present augmented reality content tethered to the first trackable reference point or the second trackable reference point.

A computing system may perform or implement any of the methods, processes, or techniques described herein. In an example, a computing system comprises one or more computing devices configured to: obtain measurement data representing measurements performed by onsite mobile devices with respect to trackable objects within a real-world environment, each measurement having an associated uncertainty value within the measurement data; maintain a collection of data in a database system that defines a set of trackable points in which each trackable point represents a trackable object to which an augmented reality content item is tethered; for each trackable point defined by the collection of data, maintain a first set of spatial values and a second set of spatial values in the database system for that trackable point in which the first set of spatial values represent a first spatial relationship between that trackable point and another trackable point forming a group of two or more trackable points, and the second set of spatial values represent a location of the trackable point in a global coordinate system.

In some examples, aspects of the LockAR system, such as COFIGs and relaxation of Trackables into more accurate or less uncertain positions, may be utilized independently of augmented reality aspects, to more accurately position any suitable object (real or virtual), targeting solution, or device. This may be done in tandem with AR content, or as a completely separate application of the technology.

ADDITIONAL EXAMPLES

A0. A computer-implemented method for accurately locating augmented reality (AR) content, the method comprising:

measuring, using one or more sensors of a computing device, a first six-degree-of-freedom (DOF) vector between a first vantage point of the computing device and a first trackable feature in a first sensor range of the computing device;

measuring, using the one or more sensors of the computing device, a second six-DOF vector between a second vantage point of the computing device and a second trackable feature in a second sensor range of the computing device;

measuring, using the one or more sensors of the computing device, a third six-DOF vector between the first vantage point and the second vantage point;

estimating, based on the first vector, the second vector, and the third vector, using a processor of the computing device, a fourth six-DOF vector between the first trackable feature and the second trackable feature;

storing the estimated fourth vector in a data store in association with the first trackable feature and the second trackable feature, such that the estimated fourth vector represents a spatial relationship between the first trackable feature and the second trackable feature;

determining, within a common spatial coordinate system, a first set of spatial coordinates for the first trackable feature and a second set of spatial coordinates for the second trackable feature; and storing, in the data store, the first set of spatial coordinates associated with the first trackable feature and the second set of spatial coordinates associated with the second trackable feature, such that the first and second sets of spatial coordinates represent respective locations of the first and second trackable features within the common coordinate system;

wherein the data store includes a fifth six-DOF vector representing a spatial relationship and an orientation of an AR content item relative to the first trackable feature.

A1. The method of A0, further comprising:

measuring, using the one or more sensors of the computing device, a sixth six-DOF vector between a current vantage point of the computing device and the second trackable feature when the second trackable feature is in a current sensor range of the computing device;

determining, using the processor of the computing device and based on the fourth vector, the fifth vector, and the sixth vector, a six-DOF current rendering vector for the current vantage point of the computing device, the current rendering vector including an orientation component; and presenting, at a graphical display of the computing device, an AR representation including the AR content item rendered based on the current rendering vector within a live view of a real-world environment for the current field of view (FOV) of the computing device.

A2. The method of A1, wherein the first trackable feature is outside the current sensor range of the computing device.

A3. The method of A0, further comprising assigning an uncertainty value to the estimated fourth vector in the data store, based on respective uncertainties in the measurements of the first vector, the second vector, and the third vector.

A4. The method of A0, wherein the computing device is a first computing device, the method further comprising: updating at least one component of the fourth vector based on a measurement by a second computing device.

A5. The method of A4, wherein updating the at least one component of the fourth vector comprises updating the uncertainty value of the fourth vector.

A6. The method of A0, further comprising:

associating the first trackable feature and the second trackable feature with a first group of trackable features in the data store, each trackable feature in the first group having a position and orientation defined with respect to a first coordinate system;

measuring, using the computing device, a seventh six-DOF vector between the first trackable feature and a third trackable feature associated with a second group of trackable features in the data store, each trackable feature in the second group having a position and orientation defined with respect to a second coordinate system; and calculating a positional offset and an orientation offset between the first group and the second group based on the seventh six-DOF vector.

A6A. The method of A6, further comprising:

adjusting the positional offset and the orientation offset between the first group and the second group based on at least one additional measurement between a selected trackable feature of the first group and a selected trackable feature of the second group.

A6B. The method of A6, further comprising associating an uncertainty value to the positional offset, the uncertainty value being based on an uncertainty of the seventh six-DOF vector.

A6C. The method of A6B, further comprising adjusting the uncertainty value of the positional offset based on at least one additional measurement between a selected trackable feature of the first group and a selected trackable feature of the second group.

A7. The method of A6, further comprising:

generating a third group comprising the first, second, and third trackable features, and defining a respective position and orientation of each of the first, second, and third trackable features with respect to a third coordinate system.

A8. The method of A6, wherein the computing device is a first computing device, the method further comprising: updating at least one component of the fourth vector based on a measurement by a second computing device, wherein updating the estimated fourth vector is performed independently with respect to the seventh vector.

A9. The method of A0, wherein the common spatial coordinate system comprises the Global Positioning System.

A10. The method of A0, wherein the computing device is a first computing device, the method further comprising:

measuring, using one or more sensors of a second computing device, an eighth six-degree-of-freedom (DOF) vector between a vantage point of the second computing device and the first trackable feature; and updating the first set of spatial coordinates based on the eight vector.

A11. The method of A10, wherein updating the first set of spatial coordinates comprises updating an uncertainty associated with the first set of spatial coordinates.

A12. The method of A0, wherein the data store is at least partially disposed on a communications network, and the computing device is in communication with the data store via the communications network.

B0. A computer-implemented method, comprising:

maintaining, in a data store, a set of trackable points, each trackable point representing a trackable physical feature to which an augmented reality (AR) content item is tetherable;

for each trackable point in the set of trackable points, maintaining a first set of estimated spatial values and a second set of estimated spatial values in the data store, the first set of estimated spatial values representing a position of the respective trackable point in a respective group coordinate system, and, by extension, one or more spatial relationships between the respective trackable point and all other trackable points of a respective group of trackable points positioned within the respective group coordinate system, and the second set of estimated spatial values representing a position of the respective trackable point in a respective global coordinate system;

obtaining first measurement data using at least one first mobile computing device, the first measurement data comprising a plurality of first measurements relating to a plurality of onsite trackable physical features within a selected real-world environment, the at least one first mobile computing device being onsite with respect to the selected real-world environment;

for each first set of spatial values corresponding to the plurality of local trackable physical features, maintaining a respective uncertainty value corresponding to the first measurement data;

obtaining second measurement data using at least one onsite second computing device, the second measurement data comprising at least one second measurement relating to the plurality of onsite trackable physical features within the selected real-world environment; and updating the first and second estimated spatial values of at least one trackable point in the set of trackable points, based on the second measurement data.

B1. The method of B0, wherein updating the first and second estimated spatial values of the at least one trackable point in the set of trackable points includes reducing the uncertainty value for the first set of spatial values.

B2. The method of B0, wherein at least one of the respective group coordinate systems has an origin and an orientation.

B3. The method of B0, further comprising:

forming a parent group comprising at least two of the respective groups of trackable points, wherein each of the at least two groups is a respective child group having a third set of spatial values representing a position and orientation of the respective group coordinate system with respect to the parent group.

B4. The method of B3, further comprising:

calculating and assigning the first set of spatial values of the trackable points in the at least two child groups with respect to the parent group coordinate system; and removing the at least two child groups from the system.

B5. The method of B0, further comprising:

presenting, at a graphical display of the at least one second computing device, an AR representation including an AR content item tethered to one of the trackable physical features within a live view of the selected real-world environment.

B6. The method of B5, wherein the trackable physical feature to which the AR content item is tethered is untracked by the first computing device.

B7. The method of B6, wherein the trackable physical feature to which the AR content item is tethered is out of sensing range of the second computing device.

B8. The method of B0, further comprising generating a new trackable point in the set of trackable points; and adding the new trackable point to one of the existing groups of trackable points, based on third measurement data taken in the selected real-world environment, such that a respective spatial relationship is defined between the new trackable point and at least one of the other trackable points.

B9. The method of B8, further comprising, for the new trackable point, maintaining the first set of estimated spatial values and the second set of estimated spatial values in the data store, the first set of estimated spatial values representing the spatial relationship between the new trackable point and at least one of the other trackable points, the second set of spatial values representing a position of the new trackable point in the global coordinate system

CONCLUSION

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computer-implemented method for accurately locating augmented reality (AR) content, the method comprising:

measuring, using one or more sensors of a computing device, a first six-degree-of-freedom (DOF) vector between a first vantage point of the computing device and a first trackable feature in a first sensor range of the computing device;

measuring, using the one or more sensors of the computing device, a second six-DOF vector between a second vantage point of the computing device and a second trackable feature in a second sensor range of the computing device;

measuring, using the one or more sensors of the computing device, a third six-DOF vector between the first vantage point and the second vantage point;

estimating, based on the first vector, the second vector, and the third vector, using a processor of the computing device, a fourth six-DOF vector between the first trackable feature and the second trackable feature;

storing the estimated fourth vector in a data store in association with the first trackable feature and the second trackable feature, such that the estimated fourth vector represents a spatial relationship between the first trackable feature and the second trackable feature;

determining, within a common spatial coordinate system, a first set of spatial coordinates for the first trackable feature and a second set of spatial coordinates for the second trackable feature;

storing, in the data store, the first set of spatial coordinates associated with the first trackable feature and the second set of spatial coordinates associated with the second trackable feature, such that the first and second sets of spatial coordinates represent respective locations of the first and second trackable features within the common coordinate system;

wherein the data store includes a fifth six-DOF vector representing a spatial relationship and an orientation of an AR content item relative to the first trackable feature;

associating the first trackable feature and the second trackable feature with a first group of trackable features in the data store, each trackable feature in the first group having a position and orientation defined with respect to a first coordinate system;

measuring, using the computing device, a seventh six-DOF vector between the first trackable feature and a third trackable feature associated with a second group of trackable features in the data store, each trackable feature in the second group having a position and orientation defined with respect to a second coordinate system; and calculating a positional offset and an orientation offset between the first group and the second group based on the seventh six-DOF vector.

2. The method of claim 1, further comprising:
measuring, using the one or more sensors of the computing device, a sixth six-DOF vector between a current vantage point of the computing device and the second trackable feature when the second trackable feature is in a current sensor range of the computing device;

determining, using the processor of the computing device and based on the fourth vector, the fifth vector, and the sixth vector, a six-DOF current rendering vector for the current vantage point of the computing device, the current rendering vector including an orientation component; and presenting, at a graphical display of the computing device, an AR representation including the AR content item rendered based on the current rendering vector within a live view of a real-world environment for a current field of view (FOV) of the computing device.

3. The method of claim 2, wherein the first trackable feature is outside the current sensor range of the computing device.

4. The method of claim 1, further comprising assigning an uncertainty value to the estimated fourth vector in the data store, based on respective uncertainties in the measurements of the first vector, the second vector, and the third vector.

5. The method of claim 1, wherein the computing device is a first computing device, the method further comprising: updating at least one component of the fourth vector based on a measurement by a second computing device.

6. The method of claim 5, wherein updating the at least one component of the fourth vector comprises updating an uncertainty value assigned to the fourth vector.

7. The method of claim 1, further comprising:
generating a third group comprising the first, second, and third trackable features, and defining a respective position and orientation of each of the first, second, and third trackable features with respect to a third coordinate system.

8. The method of claim 1, wherein the computing device is a first computing device, the method further comprising: updating at least one component of the fourth vector based on a measurement by a second computing device, wherein updating the estimated fourth vector is performed independently with respect to the seventh vector.

9. The method of claim 1, further comprising:
adjusting the positional offset and the orientation offset between the first group and the second group based on at least one additional measurement between a selected trackable feature of the first group and a selected trackable feature of the second group.

10. The method of claim 1, further comprising associating an uncertainty value to the positional offset, the uncertainty value being based on an uncertainty of the seventh six-DOF vector; and
adjusting the uncertainty value of the positional offset based on at least one additional measurement between a selected trackable feature of the first group and a selected trackable feature of the second group.

11. The method of claim 1, wherein the common spatial coordinate system comprises the World Geodetic System.

12. The method of claim 1, wherein the computing device is a first computing device, the method further comprising: measuring, using one or more sensors of a second computing device, an eighth six-degree-of-freedom (DOF) vector between a vantage point of the second computing device and the first trackable feature; and
updating the first set of spatial coordinates based on the eighth vector.

13. The method of claim 12, wherein updating the first set of spatial coordinates comprises updating an uncertainty associated with the first set of spatial coordinates.

14. The method of claim 1, wherein the data store is at least partially disposed on a communications network, and the computing device is in communication with the data store via the communications network.

15. A computer-implemented method, comprising:
maintaining, in a data store, a set of trackable points, each trackable point representing a trackable physical feature to which an augmented reality (AR) content item is tetherable;
for each trackable point in the set of trackable points, maintaining a first set of estimated spatial values and a second set of estimated spatial values in the data store, the first set of estimated spatial values representing a position of the respective trackable point in a respective group coordinate system, and, by extension, one or more spatial relationships between the respective trackable point and all other trackable points of a respective group of trackable points positioned within the respective group coordinate system, and the second set of estimated spatial values representing a position of the respective trackable point in a respective global coordinate system;
obtaining first measurement data using at least one first mobile computing device, the first measurement data comprising a plurality of first measurements relating to a plurality of onsite trackable physical features within a selected real-world environment, the at least one first mobile computing device being onsite with respect to the selected real-world environment;

for each first set of spatial values corresponding to the plurality of onsite trackable physical features, maintaining a respective uncertainty value corresponding to the first measurement data;

obtaining second measurement data using at least one onsite second computing device, the second measurement data comprising at least one second measurement relating to the plurality of onsite trackable physical features within the selected real-world environment; and updating the first and second estimated spatial values of at least one trackable point in the set of trackable points, based on the second measurement data.

16. The method of claim 15, wherein updating the first and second estimated spatial values of the at least one trackable point in the set of trackable points includes reducing the uncertainty value for the first set of spatial values.

17. The method of claim 15, wherein at least one of the respective group coordinate systems has an origin and an orientation.

18. The method of claim 15, further comprising:
forming a parent group comprising at least two of the respective groups of trackable points, wherein each of the at least two groups is a respective child group having a third set of spatial values representing a position and orientation of the respective group coordinate system with respect to the parent group.

19. The method of claim 18, further comprising:
for the trackable points in the at least two child groups, calculating and assigning the first set of spatial values in relation to the parent group coordinate system; and
removing the at least two child groups from the system.

20. The method of claim 15, further comprising:
presenting, at a graphical display of the at least one second computing device, an AR representation including an AR content item tethered to one of the trackable physical features within a live view of the selected real-world environment.

21. The method of claim 20, wherein the trackable physical feature to which the AR content item is tethered is untracked by the first computing device.

22. The method of claim 21, wherein the trackable physical feature to which the AR content item is tethered is out of sensing range of the second computing device.

23. The method of claim 15, further comprising
generating a new trackable point in the set of trackable points; and
adding the new trackable point to one of the existing groups of trackable points, based on third measurement data taken in the selected real-world environment, such that a respective spatial relationship is defined between the new trackable point and at least one of the other trackable points.

24. The method of claim 23, further comprising:
maintaining the first set of estimated spatial values and the second set of estimated spatial values for the new trackable point in the data store, the first set of estimated spatial values representing the spatial relationship between the new trackable point and at least one of the other trackable points, the second set of spatial values representing the position of the new trackable point in the global coordinate system.

25. A computer-implemented method for accurately locating augmented reality (AR) content, the method comprising:
measuring, using one or more sensors of a first computing device, a first six-degree-of-freedom (DOF) vector between a first vantage point of the first computing device and a first trackable feature in a first sensor range of the first computing device;

measuring, using the one or more sensors of the first computing device, a second six-DOF vector between a second vantage point of the first computing device and a second trackable feature in a second sensor range of the first computing device;

measuring, using the one or more sensors of the first computing device, a third six-DOF vector between the first vantage point and the second vantage point;

estimating, based on the first vector, the second vector, and the third vector, using a processor of the first computing device, a fourth six-DOF vector between the first trackable feature and the second trackable feature;

storing the estimated fourth vector in a data store in association with the first trackable feature and the second trackable feature, such that the estimated fourth vector represents a spatial relationship between the first trackable feature and the second trackable feature;

determining, within a common spatial coordinate system, a first set of spatial coordinates for the first trackable feature and a second set of spatial coordinates for the second trackable feature; and storing, in the data store, the first set of spatial coordinates associated with the first trackable feature and the second set of spatial coordinates associated with the second trackable feature, such that the first and second sets of spatial coordinates represent respective locations of the first and second trackable features within the common coordinate system;

wherein the data store includes a fifth six-DOF vector representing a spatial relationship and an orientation of an AR content item relative to the first trackable feature;

measuring, using one or more sensors of a second computing device, a sixth six-degree-of-freedom (DOF) vector between a vantage point of the second computing device and the first trackable feature; and updating the first set of spatial coordinates based on the sixth vector.

26. The method of claim 25, further comprising:
measuring, using the one or more sensors of the first computing device, a seventh six-DOF vector between a current vantage point of the first computing device and the second trackable feature when the second trackable feature is in a current sensor range of the first computing device;

determining, using the processor of the first computing device and based on the fourth vector, the fifth vector, and the seventh vector, a six-DOF current rendering vector for the current vantage point of the first computing device, the current rendering vector including an orientation component; and presenting, at a graphical display of the first computing device, an AR representation including the AR content item rendered based on the current rendering vector within a live view of a real-world environment for a current field of view (FOV) of the first computing device.

27. The method of claim 26, wherein the first trackable feature is outside the current sensor range of the first computing device.

28. The method of claim 25, further comprising assigning an uncertainty value to the estimated fourth vector in the data store, based on respective uncertainties in the measurements of the first vector, the second vector, and the third vector.

29. The method of claim 25, further comprising: updating at least one component of the fourth vector based on a measurement by the second computing device.

30. The method of claim 29, wherein updating the at least one component of the fourth vector comprises updating an uncertainty value assigned to the fourth vector.

31. The method of claim 25, further comprising:
associating the first trackable feature and the second trackable feature with a first group of trackable features in the data store, each trackable feature in the first group having a position and orientation defined with respect to a first coordinate system;
measuring, using the first computing device, an eighth six-DOF vector between the first trackable feature and a third trackable feature associated with a second group of trackable features in the data store, each trackable feature in the second group having a position and orientation defined with respect to a second coordinate system; and
calculating a positional offset and an orientation offset between the first group and the second group based on the eighth six-DOF vector.

32. The method of claim 31, further comprising:
generating a third group comprising the first, second, and third trackable features, and defining a respective position and orientation of each of the first, second, and third trackable features with respect to a third coordinate system.

33. The method of claim 31, further comprising:
updating at least one component of the fourth vector based on a measurement by the second computing device, wherein updating the estimated fourth vector is performed independently with respect to the eighth vector.

34. The method of claim 31, further comprising:
adjusting the positional offset and the orientation offset between the first group and the second group based on at least one additional measurement between a selected trackable feature of the first group and a selected trackable feature of the second group.

35. The method of claim 31, further comprising associating an uncertainty value to the positional offset, the uncertainty value being based on an uncertainty of the eighth six-DOF vector; and
adjusting the uncertainty value of the positional offset based on at least one additional measurement between a selected trackable feature of the first group and a selected trackable feature of the second group.

36. The method of claim 25, wherein the common spatial coordinate system comprises the World Geodetic System.

37. The method of claim 25, wherein updating the first set of spatial coordinates comprises updating an uncertainty associated with the first set of spatial coordinates.

38. The method of claim 25, wherein the data store is at least partially disposed on a communications network, and the first computing device is in communication with the data store via the communications network.

* * * * *